(12) United States Patent
Glazer et al.

(10) Patent No.: US 9,350,798 B2
(45) Date of Patent: May 24, 2016

(54) METHODS AND SYSTEMS FOR TRANSITIONING BETWEEN ARBITRARY SHAPES

(71) Applicant: Oracle International Corporation, Redwood Shores, CA (US)

(72) Inventors: Brendon Glazer, Billerica, MA (US); Prashant Singh, Lexington, MA (US); Hugh Zhang, Winchester, MA (US); Jairam Ramanathan, Waltham, MA (US); Baofeng Yu, Westford, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 32 days.

(21) Appl. No.: 14/526,286

(22) Filed: Oct. 28, 2014

(65) Prior Publication Data

US 2015/0161805 A1     Jun. 11, 2015

Related U.S. Application Data

(60) Provisional application No. 61/914,057, filed on Dec. 10, 2013.

(51) Int. Cl.
*G06T 11/20* (2006.01)
*H04L 29/08* (2006.01)
*G06T 13/80* (2011.01)

(52) U.S. Cl.
CPC ............. *H04L 67/10* (2013.01); *G06T 11/206* (2013.01); *G06T 11/203* (2013.01); *G06T 13/80* (2013.01)

(58) Field of Classification Search
None
See application file for complete search history.

(56) References Cited

U.S. PATENT DOCUMENTS

| | | | |
|---|---|---|---|
| 2009/0096793 A1* | 4/2009 | Hirasawa | G06T 11/40 345/441 |
| 2010/0214299 A1* | 8/2010 | Robertson | G06T 13/80 345/440 |

* cited by examiner

*Primary Examiner* — Xiao Wu
*Assistant Examiner* — Steven Elbinger
(74) *Attorney, Agent, or Firm* — Kilpatrick Townsend & Stockton, LLP

(57) ABSTRACT

Various arrangements for transitioning between data visualizations are presented. A first and second general path may be determined that define a first and second shape, respectively. A plurality of pairs of drawing commands may be created such that each pair of the plurality of pairs of drawing commands includes a first drawing command from the first general path and a second drawing command from the second general path. The plurality of pairs of drawing commands may be modified such that each pair of the plurality of pairs of drawing commands includes a single type of drawing command. A visual transition may be output for presentation between the first shape and the second shape using the modified plurality of pairs of drawing commands.

20 Claims, 12 Drawing Sheets

METHODS AND SYSTEMS FOR TRANSITIONING BETWEEN ARBITRARY SHAPES

CROSS REFERENCES TO RELATED APPLICATIONS

This application claims priority to U.S. Provisional Application No. 61/914,057, filed Dec. 10, 2013, entitled "Methods and Systems for Transitioning Between Arbitrary Shapes," which is hereby incorporated by reference for all purposes. U.S. patent application Ser. No. 14/514,217, entitled "Pluggable Layouts for Data Visualization Components," filed Oct. 14, 2014, is hereby incorporated by reference for all purposes.

BACKGROUND

When analyzing data, it can be useful to switch among different visual representations of the data. For example, while certain aspects of data may be expressed well in a first visual representation, a second visual representation may be more effective for expressing another aspect of the data. Such visual representations of data can be presented in the form of graphs, maps, or other graphical forms of visualization. For instance, pie charts, bar charts, and maps are common graphical visualizations of data. Conventionally, if a user desires to transition between different visual representations of a same data set, a first data visualization may cease being displayed and the second data visualization may be displayed in response to user input.

SUMMARY

Various systems, methods, and computer-readable mediums are presented for transitioning between data visualizations. In some embodiments, a method for transitioning between data visualizations is presented. The method may include determining, by a computer system, a first general path that defines a first one or more shapes and a second general path that defines a second one or more shapes. The first one or more shapes and the second one or more shapes may be different shapes. The first general path may include a first plurality of drawing commands that define the first one or more shapes. The second general path may include a second plurality of drawing commands that define the second one or more shapes. The method may include creating, by the computer system, a plurality of pairs of drawing commands such that each pair of the plurality of pairs of drawing commands includes a first drawing command from the first plurality of drawing commands of the first general path and a second drawing command from the second plurality of drawing commands of the second general path. The method may include modifying, by the computer system, the plurality of pairs of drawing commands such that each pair of the plurality of pairs of drawing commands includes a single type of drawing command. The method may include outputting, by the computer system for presentation, a transition between the first shape and the second shape using the modified plurality of pairs of drawing commands.

Embodiments of such a method (or various other forms of embodiments, such as systems, devices, and computer-readable mediums) may include one or more of the following features: The method may include adding, by the computer system, at least one null drawing command to the second general path such that the first general path and the second general path each have a same quantity of drawing commands. The method may include receiving, by the computer system, a command to trigger a visual transition of the first shape into the second shape, wherein the transition between the first shape and the second shape using the modified plurality of pairs of drawing commands is performed based on receipt of the command. Outputting the transition between the first shape and the second shape may occur as part of a transition of a first plurality of shapes to a second plurality of shapes, the first plurality of shapes including the first shape and the second plurality of shapes including the second shape. Modifying the plurality of pairs of drawing commands such that each pair of the plurality of pairs of drawing commands includes the single type of drawing command may include, for a pair of drawing commands of the plurality of pairs of drawing commands: converting the first drawing command of the first general path to a type of the second drawing command of the second general path, wherein the first drawing command is eligible to be expressed as the second type of the second drawing command. The method may include determining, by the computer system, a first direction in which the first general path defines drawing of the first shape. The method may include determining, by the computer system, a second direction in which the second general path defines drawing of the second shape. The method may include determining, by the computer system, that the first direction and the second direction are opposite. The method may include, based on the first direction being opposite the second direction, reversing, by the computer system, an order of drawing commands of a general path selected from the group consisting of: the first general path and the second general path.

Additionally or alternatively, embodiments may include one or more of the following features: The method may include identifying, within the first general path, a first plurality of subpaths, wherein each subpath of the first plurality of subpaths define a separate shape. The method may include defining each subpath of the first plurality of subpaths explicitly such that each subpath of the first plurality of subpaths begins with a command that defines a location. The method may include identifying, within the second general path, a second plurality of subpaths, wherein each subpath of the second plurality of subpaths defines a separate shape. The method may include defining each subpath of the second plurality of subpaths explicitly such that each subpath of the second plurality of subpaths begins with a command that defines a location. The method may include pairing the first plurality of subpaths with the second plurality of subpaths such that each subpath of the first plurality of subpaths is paired with a subpath of the second plurality of subpaths. Pairings between the first plurality of subpaths and the second plurality of subpaths may be selected based on magnitudes of area defined by the shapes associated with the first plurality of subpaths and the second plurality of subpaths. The method may include defining, for a first subpath of the first general path, a first relative start point, wherein drawing of the first subpath of the first general path is configured to begin from the first relative start point. The method may include defining, for a second subpath of the second general path, a second relative start point. Drawing of the second subpath of the second general path may be configured to begin from the second relative start point. The first relative start point and the second relative start point may define corresponding locations of the first subpath and the second subpath.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
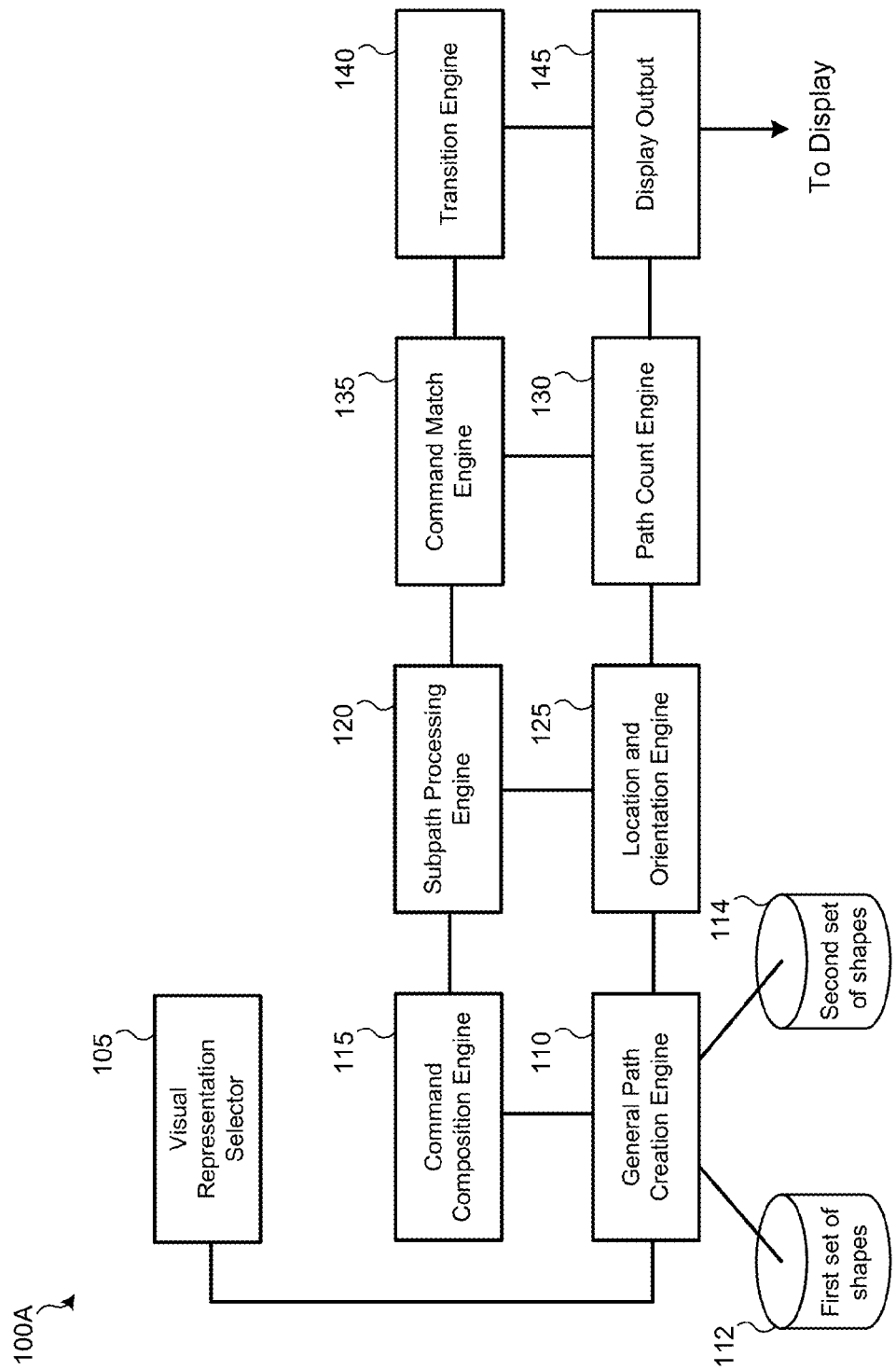
FIG. 1A illustrates an embodiment of a system configured to transition presentation of a first shape to a second shape.

When a user indicates that data is to be presented as a different data visualization, such as in a pie chart rather than a bar chart, it may aid the user experience if a smooth transition from the first data visualization (e.g., the bar chart) to the second data visualization (e.g., the pie chart) is presented to the user. Such a transition can involve the individual elements of the first data visualization transitioning into the individual graphical elements of the second data visualization, such as a bar of a bar chart transitioning into a slice of the pie chart. Not only does such a transition provide the user with a visually pleasing animation of a transition to watch, but such a transition can also be useful to the user. A useful aspect may be that the transition illustrates which pieces of data in the first data visualization correspond to which pieces of data in the second data visualization. Returning to the previous example, in the first data visualization, a piece of data may be represented by a bar (e.g., a first shape) in a bar chart. The same piece of data in the second visualization may be represented by a pie slice (e.g., a second shape) in a pie chart. A transition from the bar chart to the pie chart may show the bar graphically transitioning (e.g., morphing and moving) into the corresponding pie slice—thus showing the user which pie slice of the pie chart represents the same piece of data as the bar in the bar graph. As presented to a user, such a transition may involve one or more arbitrary shapes transitioning into one or more different arbitrary shapes. As such, the arrangements detailed herein to produce and cause the graphical transition can be used to transition one or more arbitrary shapes into one or more other arbitrary shapes. Therefore, regardless of the one or more shapes present in a first data visualization and the one or more shapes present in the second data visualization, the arrangements detailed herein may be used to animate a smooth transition from the shapes of the first data visualization to the shapes of the second data visualization.

Such transition functionality may be incorporated as part of a data visualization code component. Such a data visualization component may be implemented as a prebuilt piece of code into an application being created by a developer using a programming language. For example, a developer may use Oracle's® JDeveloper to create an application using the Java™ programming language. In using JDeveloper to create an application in Java™, the developer may have access to a number of prebuilt pieces of code, including a data visualization component. The developer may configure and customize the data visualization component, such as the format in which the data visualization component outputs a graphical representation of data. The developer may be able to supply pieces of data to the data visualization component and use the prebuilt functionality of the data visualization component to create a graphical representation of data for the user. The functionality of the data visualization component may include the ability to graphically transition one or more graphical shapes presented as part of a first data visualization to one or more different graphical shapes presented as part of a second data visualization. As such, by a developer incorporating the data visualization component as part of a software application being developed by the developer, the developer may be able to implement the transition functionality incorporated as part of the data visualization component detailed herein.

The application being created by the developer may be intended to be cloud-based. By being cloud-based, the application may be executed by a remote computer system and accessed by a user via network and a client computer system. The application may be presented to the user via a browser window. The application may also be loaded by the client computer system and executed locally. In other embodiments, the transition functionality detailed herein is directly incorporated into an application (without being part of a prebuilt code component). Further, in some embodiments, it may be possible to implement the transition functionality detailed herein using firmware and/or customized computerized hardware. Embodiments that use software can use one or more computer systems (e.g., servers) to execute the software to perform the transition functionality.

FIG. 1A illustrates an embodiment of a system 100A configured to transition a first shape to a second shape. System 100A may represent components of visualization component which may be incorporated as part of a software application under development. For instance, a software developer may incorporate system 100A as a prebuilt component into an application being coded. Following incorporation as part of the application, the application may be compiled. It should be understood that the term "shape" as used herein, refers to a graphical object containing one or more distinct parts. For instance, a shape may be a single circle, oval, square, polygon or some other single drawing object that is defined by one or more straight and/or curved lines arranged at various angles. A "shape" may also include multiple subcomponents. For instance, an outline of the state of Hawaii may be considered a shape, even though it has distinct, separate islands. System 100A may include: a visual representation selector 105, a general path creation engine 110, a first set of shapes 112, a second set of shapes 114, a command composition engine 115, a subpath processing engine 120, a location and orientation engine 125, a path count engine 130, a command match engine 135, a transition engine 140, and a display output module 145. Each of these components may be implemented using computerized components as detailed in relation to FIG. 9. A data visualization component may be implemented using software, firmware, and/or hardware. For example, if a data visualization component is implemented as software, it is executed by underlying computerized hardware. System 100A may be distributed across multiple computer systems (e.g., a server and client computer system or multiple servers). The functionality of each component of system 100A may be performed by fewer components than illustrated in FIG. 1 or may be divided out to be performed by more components. As such, FIG. 1 represents a block diagram of an embodiment showing how transition functionality among arbitrary shapes can be implemented.

Further, it should be understood that various commands of scalable vector graphics (SVG) or Java™ are referred to below. While the exact name of the commands may vary, similar concepts and principles may be applied to other programming languages, such as programming languages that allow for the incorporation of prebuilt software components to interact with code being written by a developer and/or other prebuilt software components. For example, a "MoveTo" command may be understood, generally, as a command that results in a position being "moved to" another position.

Visual representation selector 105 may allow a user of an application into which system 100A has been incorporated to select a particular visual representation of data for presentation. For instance, the user may be permitted to select among a pie chart, a map, a bar graph, an organization chart, and/or any other data visualization arrangement that is available for a dataset to be visually presented in. In other embodiments, the application may determine when transitions between visual representations should occur. For example, a transition between two data visualizations may be triggered based on time elapsing or some threshold condition occurring. In some embodiments, a user can interact with visual representation selector 105 by providing user input. A first data visualization may present a set of data to the user using one or more graphical shapes. Each graphical shape of the first set of shapes may represent one or more pieces of data from the set of data in the first data visualization. For this first data visualization, a first set of shapes 112 may be stored. The first set of shapes may contain one or more graphical shapes. Each graphical shape may be stored as a series of commands that can be used to draw the shape.

General path creation engine 110 of system 100A may access both first set of shapes 112 and second set of shapes 114. System 100A may receive first set of shapes 112 and second set of shapes 114 from some external source or may define the shapes itself. For instance, a database may be accessed that defines both sets of shapes. The transition to be performed may involve transitioning a display of a first shape from the first set of shapes 112 to a second shape of the second set of shapes 114. While embodiments detailed herein focus on transitioning from a first shape to a second shape, it should be understood that multiple shapes may be transitioned into a visualization of multiple other shapes simultaneously, such as illustrated in FIGS. 4A-4D. The first shape and the second shape may be converted into a first general path and a second general path, respectively. In some embodiments, one or both of the first and second shapes may already be in the form of a general path. A "general path" can be understood as a series of drawing commands that can be used by a computer system to "draw" a shape. For instance, in SVG, common drawing commands that may be used to create a shape include a "LineTo" command, a "CubicCurveTo" command, and a "QuadraticCurveTo" command, an ellipse command, etc. If a shape is a polygon, the shape may be expressed as a general path that includes series of one or more "LineTo" commands.

The SVG drawing commands include: absolute moveTo, relative moveTo, closePath, absolute lineTo, relative lineTo, absolute horizontal lineTo, relative horizontal lineTo, absolute vertical lineTo, relative vertical lineTo, absolute cubic curveTo, relative cubic curveTo, absolute smooth cubic curveTo, relative smooth cubic curveTo, absolute quadratic curveTo, relative quadratic curveTo, absolute smooth quadratic curveTo, relative smooth quadratic curveTo, absolute arcTo, and relative arcTo. While these drawing commands may be generally directed to scalable vector graphics (SVG), it should be understood that other forms of expression may have analogous drawing commands. For instance, a "LineTo" command of SVG may correspond to a command of another programming language that results in a line being drawn. Similar corollaries may exist for other drawing commands.

Command composition engine 115 may receive the general paths created for the first shape and the second shape. Command composition engine 115 of system 100A may convert any concatenated implicit drawing commands of each general path to explicit commands within each general path. For various drawing commands in some programming languages, if a single drawing command is followed by a plurality of sets of coordinates, the drawing command may be repeated for each of the provided coordinates. For both the first general path and the second general path, each such instance of an implicit drawing command may be converted to an explicit, duplicate command for each set of coordinates. Therefore, for example, if a single "LineTo" command was associated with multiple sets of coordinates, individual "LineTo" commands may be implemented for each instance of coordinates. By modifying implicit commands to be explicit, each drawing command of the first and second general paths may be implemented and interpreted independently of other drawing commands.

Command composition engine 115 of system 100A may convert relative drawing commands, if any, of both the first general path and the second general path to absolute drawing commands. A relative drawing command relies on coordinates relative to a previous performed drawing command. By converting into absolute drawing commands, the drawing commands can be performed independently of other drawings commands. Therefore, a definite starting set of coordinates is defined for a drawing command, rather than being relative to a preceding drawing command. Command composition engine 115 of system 100A may also convert shorthand drawing commands to verbose drawing commands for the first and second general paths. For instance, certain commands, such as "HorizontalLineTo" or "VerticalLineTo" may represent shorthand commands for implementing horizontal and vertical lines. Such commands may be converted to a more general command, which may require additional coordinates. Table 1 lists at least some possible conversions from original commands to converted commands.

TABLE 1

| Original Command | Converted Command |
| --- | --- |
| horizontal lineTo | lineTo |
| vertical lineTo | lineTo |
| smooth cubic curveTo | cubic curveTo |
| smooth quadratic curveTo | quadratic curveTo |

Subpath processing engine 120 of system 100A may make subpaths, if any, of each general path explicit. A general path may include one or more "ClosePath" commands (which closes drawing of a single graphical object). If multiple closepath drawing commands are present within a general path, the general path may be understood to have multiple subpaths. For example, if a shape is meant to represent Hawaii, the general path for Hawaii may include a subpath for each of Hawaii's islands. If only a single "ClosePath" command is present, a general path can be understood to have only a single subpath. Each subpath may be modified to begin with an explicit "MoveTo" command. Such a "MoveTo" command may permit drawing commands of the subpath to be performed independent of other drawing commands already executed as part of another subpath of the same general path.

Subpath processing engine 120 of system 100A may also break each general path into its subpaths to allow each subpath to be drawn independently of other paths and subpaths. While the previous step makes subpaths explicit within the containing general path, step 535 breaks a general path into its constituent subpaths. For instance, each time a "moveTo" command is encountered within a general path, the moveTo command and subsequent commands (until either the end of the general path or the next moveTo command) can be broken out as a separate subpath from the general path. These subpaths can be treated independently of each other outside of the containing general path. Therefore, subpaths, following step 535, may be separate shapes.

Subpath processing engine 120 of system 100A may sort subpaths of the general path based size. The size of each subpath may be defined based on the magnitude of an area drawn by drawing commands of the subpath, a length of a perimeter defined by the drawing commands of the subpath, or some other calculable value for the subpath. By sorting each subpath based on size, a largest subpath of the first general path of the first shape may be paired with the largest subpath of the second general path of the second shape. This arrangement may allow for the largest drawing object of the first general path to be transitioned into the largest drawing object of the second general path. Following subpath processing engine 120 performing this ordering, each general path may have its subpaths, if any, ordered from largest to smallest (or smallest to largest).

Subpath processing engine 120 of system 100A may pair subpaths. For the first and second general path, a same number of subpaths may be desired to be present in each. If the first general path and the second general path each have the same number of subpaths, no further processing may be necessary by subpath processing engine 120 (as an example, commonly both the first and second general path may each have only one subpath). If either the first general path or the second general path has fewer subpaths than the other general path, an appropriate number of empty subpaths may be added to the general path having fewer subpaths. For example, if the first general path has three subpaths and the second general path has one subpath, two empty subpaths may be added to the second general path. An empty subpath refers to a subpath that does not contain any drawing commands. An empty subpath may be appended within a general path before or after a non-empty subpath without affecting the appearance of the shape created based on the general path. Subpath processing engine 120 may further pair the subpaths. A subpath from the first general path may be paired with a subpath from the second general path. A subpath of one of the general paths may be paired with an empty subpath of the other general path. Such pairing may be performed in order of size. Therefore, a subpath from the first general path that defines a largest drawing object from among the subpaths of the first general path may be paired with a subpath of the second general path that defines a largest drawing object from among the subpaths of the second general path.

Subpath processing engine 120 of system 100A may also replace ending "ClosePath" commands with "LineTo" commands. A "ClosePath" command or other form of drawing command that closes a drawing shape may serve to draw a line from a current set of coordinates (the location after performing one or more previous drawing commands) to the coordinates from which a subpath began being drawn. An explicit "LineTo" command may be used to replace the "ClosePath" command. It should be understood that a command other than a "LineTo" command may be used to replace a "ClosePath" command. Replacing such a closepath command allows for the line associated with the command to be drawn independently of other drawing commands rather than being contingent on previously drawing commands to determine a set of coordinates and the starting point of drawing the object.

Subpath processing engine 120 may pass the modified general paths for the first shape and the second shape to location and orientation engine 125. Location and orientation engine 125 of system 100A may define common relative subpath start points for each subpath of each general path. For each subpath pair (a subpath from the first general path and a corresponding subpath from the second general path), a same or similar relative start point may be used for each subpath. For instance, since a subpath may define a closed shape, the subpath may begin being drawn from any point along the subpath. A relative position, such as top-left, top-right, bottom-left, or bottom-right, may be used as a position from where each subpath should be defined. For instance, the minimum coordinates (minimum x, minimum y) of a subpath may be used to find the top left of a subpath (assuming that (0,0) is at the top left as in scalable vector graphics). Also possible is the use of maximum coordinates, a combination (e.g., minimum x, maximum y) or the closest to a predefined coordinate value (e.g., closest to (5,5)). Once the predefined relative position is determined for each subset, the subpath may be split at that point. An initial "MoveTo" command (which defines a set of coordinates from where the subset of drawing commands would commence drawing) of the subset may be replaced with the coordinates of the predefined relative start position of the subpath and the drawing commands of the subset may be reordered to draw from the relative start position defined by the "MoveTo" command.

Location and orientation engine 125 of system 100A may orient subpaths of each general path in the same direction. Since drawing commands can be processed in order from a general path, it may be desirable for a common direction of either clockwise or counterclockwise (anticlockwise) to be used to draw each subpath of each general path. The orientation of a subpath may be determined using a polygon that has vertices of coordinates along a subpath. The vector cross product of two adjacent edges sharing a common vertex on the convex hull of the polygon can indicate the orientation (clockwise or counterclockwise) of the polygon. For instance, a vertex on a convex hull of the polygon can be found by looking for the minimum (x,y) coordinates of the polygon. If one or more subpaths result in drawing in opposite directions, the one or more subpaths of one or both of the general paths of the first shape and the second shape may be traversed from end to start, with coordinates and parameters adjusted accordingly. Such an adjustment will result in all of the subpaths being drawn in the same general direction (clockwise or counter clockwise). It may also be possible to determine whether a polygon is oriented clockwise or counter clockwise about a point within the polygon (e.g., the center of the polygon) by triangulating the polygon (dividing the polygon into triangles using two vertices along the perimeter of the polygon and the polygon's center point) and summing the angles at the center using a cross product to track the sign of each angle.

Location and orientation engine 125 may pass the modified general paths for the first shape and the second shape to path count engine 130. Path count engine 130 may make each subpath in a particular pair of subpaths of the first and second general path contain the same number of drawing commands. That is, a first subpath from the first general path that forms a first pair with a second subpath from the second general path each are made to have the same number of drawing commands. A second pair of subpaths may have different numbers of drawing commands from the first pair, but the two subpath members of the second pair each have the same number of drawing commands. From each pair of subpaths, a subpath may be identified that has the greatest number of drawing commands. The other subpath may have null drawing commands added such that each subpath of the pair has the same number of drawing commands. If the paired subpaths happen to have the same number of drawing commands, no addition of null drawing commands to either subpath is necessary.

The adding of null drawing commands may be performed in multiple ways. A subpath can be padded with null drawing commands by inserting the additional null drawing commands at the beginning or end of the subpath. The additional null drawing commands may also be distributed throughout the drawing commands of the subpath. Distribution of null drawing commands may be performed uniformly throughout the subpath. For instance, an index number within the subpath may be used to determine how additional null drawing commands should be distributed. However, if a subpath contains a long segment and several shorter segments, for a smoother transition it may be desirable to cluster the null drawing commands before and after the longer segment. In some embodiments, if a segment longer than a predefined distance threshold is present in the subpath to receive null drawing commands, the segment may be broken into several segments (and thus be represented by multiple drawing commands), thus allowing null drawing commands to be inserted among the several segments. Each null drawing command does not affect the drawing of the shape because the null command does not cause any line or curve to be drawn. However, such null commands will result in a line or curve being drawn when the transition between the first shape and the second shape is being output.

Path count engine 130 may pass the modified general paths for the first shape and the second shape to command match engine 135. Command match engine 135 may match up individual pairs of drawing commands. At this point, each subpath from the first general path of the first shape was paired with a subpath from the second general path of the second shape. For each pair of subpaths, a corresponding drawing command in the other subpath is determined. For example, the first drawing command of the first subpath is paired with the first drawing command of the second subpath, the second drawing command of the first subpath is paired with the second drawing command of the second subpath, and so on.

Once pairs of drawing commands have been determined, each pair of drawing commands may be modified, as necessary, such that each drawing command of the pair are of the same type of drawing command. For example, a pair of drawing commands, if possible, may be modified such that each drawing command of the pair is a "lineto" drawing command. To make each pair of drawing commands match in type, several substeps may be performed, as detailed below.

If the types of drawing commands in the pair match, no additional steps to alter the matching drawing commands may be necessary. If one of the drawing commands of the pair is a previously-inserted null drawing command, the null drawing command may be set or modified to be the type of drawing command of the other drawing command of the pair. The null drawing command may be set to have a same starting and ending point so that it does not affect the shape of which its subpath is a part. If the paired drawing commands are different (and at least one of the paired drawing commands is not a null drawing command), if possible, the simpler drawing command may be converted into the more complex drawing command. For example, if a pair of drawing commands includes a "LineTo" command and a "CurveTo" command, the "LineTo" command may be converted to a "CurveTo" command, set with zero curve (e.g., by having a control point of the curve placed on the line). As another example, a "QuadraticCurveTo" may be converted to a "CubicCurveTo" command. For such a conversion, the "QuadraticCurveTo" command may be set to a "CubicCurveTo" command with coincident control points.

In some instances, it may not be feasible to change a first type of drawing command directly into a second type of drawing command. If such a situation is present, the drawing commands of the pair are referred to as non-analogous. For such instances of non-analogous drawing commands, a null drawing command may be inserted into each subset. As such, the non-analogous pair is altered such that each non-analogous drawing command is re-paired with inserted null drawing commands. A possible way of inserting such null drawing commands into each subset is listed below. In Equations 1 and 2, x and y are paired non-analogous drawing commands.

$$\text{Replace } (x) \leftrightarrow (y) \text{ with } \begin{pmatrix} x \\ \text{null command} \end{pmatrix} \begin{matrix} \leftrightarrow \\ \leftrightarrow \end{matrix} \begin{pmatrix} \text{null command} \\ y \end{pmatrix} \quad \text{Eq. 1}$$

or $$\text{Replace } (x) \leftrightarrow (y) \text{ with } \begin{pmatrix} \text{null command} \\ x \end{pmatrix} \begin{matrix} \leftrightarrow \\ \leftrightarrow \end{matrix} \begin{pmatrix} y \\ \text{null command} \end{pmatrix} \quad \text{Eq. 2}$$

As such, the x drawing command in the first subpath is paired with a newly-added null drawing command in the second subset and the y drawing command in the second subpath is paired with a newly-added null command in the first subpath. The x drawing command and the y drawing command may be kept in adjacent pairs of drawing commands. Each null drawing command is set to be of the type of the drawing command with which it is paired. For example, if x is a "LineTo" command, the null drawing command paired with x is made to also be a "LineTo" command.

Transition engine 140 of system 100A may receive the modified first and second general paths from command match engine 135 to perform the transformation of each general path. If the first and second shape corresponding to the first general path and the second general path are nested in a display list and affected by one or more matrix transformations, the shapes can be preparented to a common parent and each general path transformed by a concatenated transformation matrix from the common parent to the original location in the display list. This step may be generalized as putting all the paths into a same coordinate system. For example, if two squares are drawn from (0,0) to (10,10), a transformation matrix can be applied to one of them to translate it to (50,50), so it appears on screen to be drawn from (50,50) to (60,60). The intrinsic coordinates of this square are still from (0,0) to (10,10) within their own coordinate system. The transformation matrix translated that whole coordinate system. If morphing is between these two squares, their internal coordinates are still identical, but, they appear in different locations on screen to the user. The transformation matrix can be removed from the second square and instead applied to the coordinates of its path, thereby modifying the path itself. Now the path coordinates contain the translation information. So, we have one square drawn from (0,0) to (10,10) and another square drawn from (50,50) to (60,60), and we can morph between them.

Following the general paths and subpaths, if present, being modified by system 100A, the modified first general path and the modified second general path may each still result in the same final shapes being drawn as the unmodified commands stored before the detailed steps were performed. Rather, the modified general paths may facilitate a graphical transition between the first shape and the second shape.

Display output module 145 of system 100A may receive the modified first and second general paths from transition engine 140, may perform a visual transition from the first shape to the second shape, and may be output for presentation to the user. The output of the transformation may involve morphing each drawing command from the first general path into the paired drawing command from the second general path in the form of an animation. For instance, this may involve linearly transitioning each set of coordinates present in the first drawing command to the coordinates of the second drawing command. As an example, if a first drawing command is a "lineto" command from coordinates (0,0) to (0,10) and the paired, second drawing command is a "lineto" command from coordinates (10,0) to (10,5), the transition may, for example, involve outputting for display a transition that includes lines from: (2,0) to (2,9), (4,0) to (4,8), (6,0) to (6,7), and (8,0) to (8,6). Each of these intermediary transitions may be output and presented to a user such that the transition is viewable by the user. After such a transition, the second drawing command using coordinates (10,0) to (10,5) may be output for presentation. Such a transition may be performed for each pair of drawing commands in each subpath of the first general path and the second general path.

While such morphing is occurring, the shape may be moved from the location of the first shape to the location of the corresponding second shape (e.g., on the basis of the transition of the coordinates used in the drawing commands). The user may be able to initially view the first shape, then may view the transformation. After viewing the transformation, the user may view the second shape. The entire transition may take a second or less. The amount of time for the transition to take may be settable by a developer that incorporated system 100A into an application under development or may be settable by the end user. Similarly, the number of frames used to present the transition may be customized by the developer.

Figure 1B:
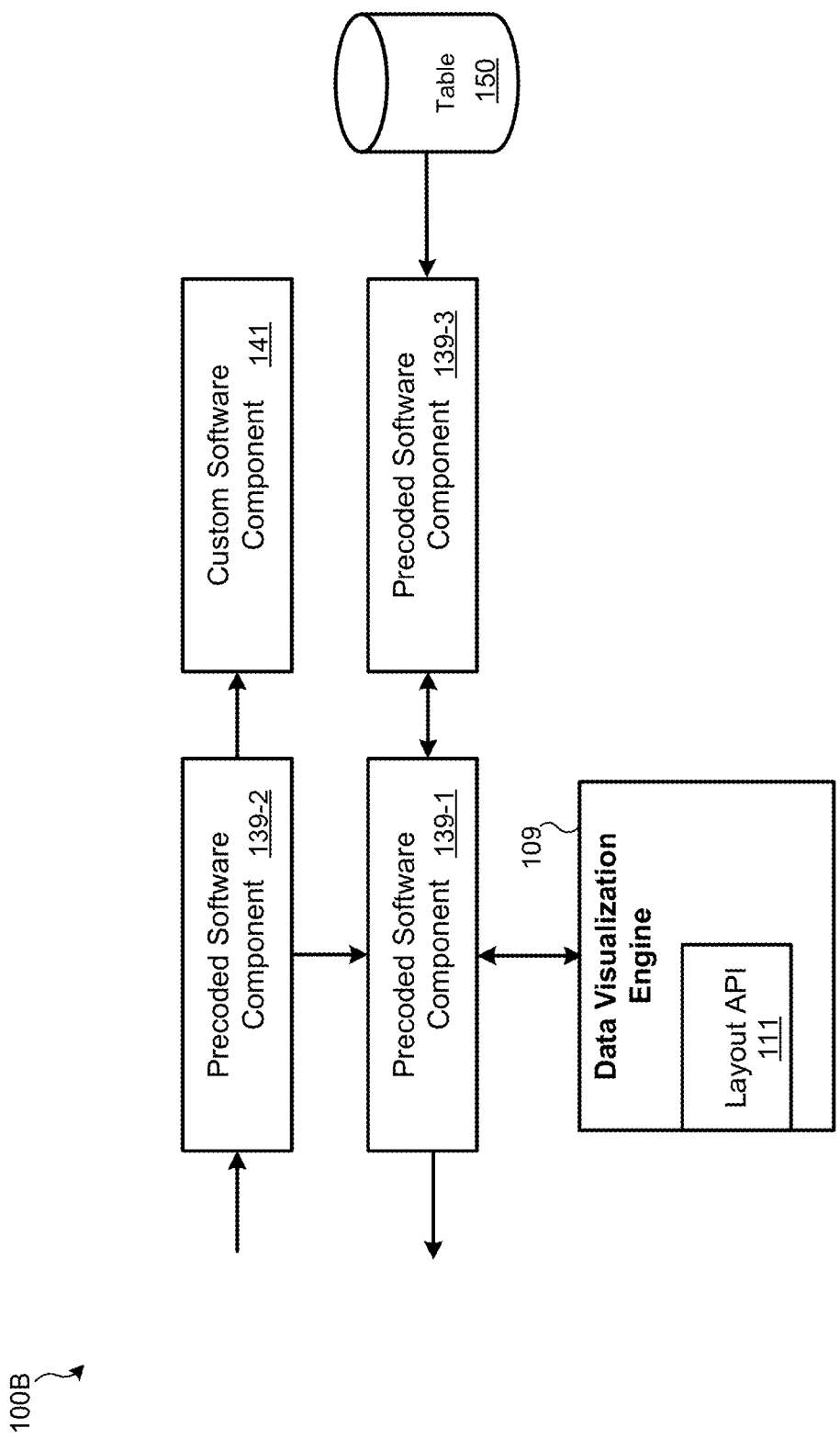
FIG. 1B illustrates an embodiment of an application under development that has an incorporated data visualization system.

FIG. 1B illustrates an embodiment of an application 100B under development that has an incorporated data visualization system. Application 100B can represent an application being developed by an application developer. Such an application may be developed locally, such as on the computer system being used by the developer or remotely. In a remote situation, the developer may interact with a remote server which compiles and debugs code. The developer may interact with the remote server via a computerized device and one or more networks, such as a tablet computer or desktop computer.

Application 100B may be under development and may be composed of one or more precoded software components and/or one or more custom software components. Precoded software components 139 may represent precoded software components to which the developer has access. Such precoded software components 139 (which in FIG. 1B includes 139-1, 139-2, and 139-3) may be made available via the development environment that the developer is using to create application 100B. The developer may further configure precoded software components 139 to execute and interact as desired by the developer. Custom software component 141 may represent a piece of code developed from scratch by the developer, which can interact with precoded software components 139. In addition to preconfigured and custom software components being present in the application, data structures, such as table 150, may be either directly incorporated into the application and/or may be accessible by the application.

One of such precoded software components may be data visualization engine 109, which can include system 100A of FIG. 1A. Data visualization engine 109 may include a layout API 111 that allows for a separate layout plug-in to be used to define the locations of graphical elements to be arranged for presentation to a user. When the code for application 100B is compiled, data visualization engine 109 may be incorporated as part of the compiled, executable code. Such code may then be executed by an end user's computer system or on behalf of an end user, such as in the form of a cloud-based application that is executed by a remote server. Therefore, by data visualization engine 109 being incorporated by a developer into an application under development, when the application is compiled and executed, system 100A, which can be part of data visualization engine 109, may be used for animating and morphing one visual representation of data into another visual representation of (likely the same) data.

Figure 2:
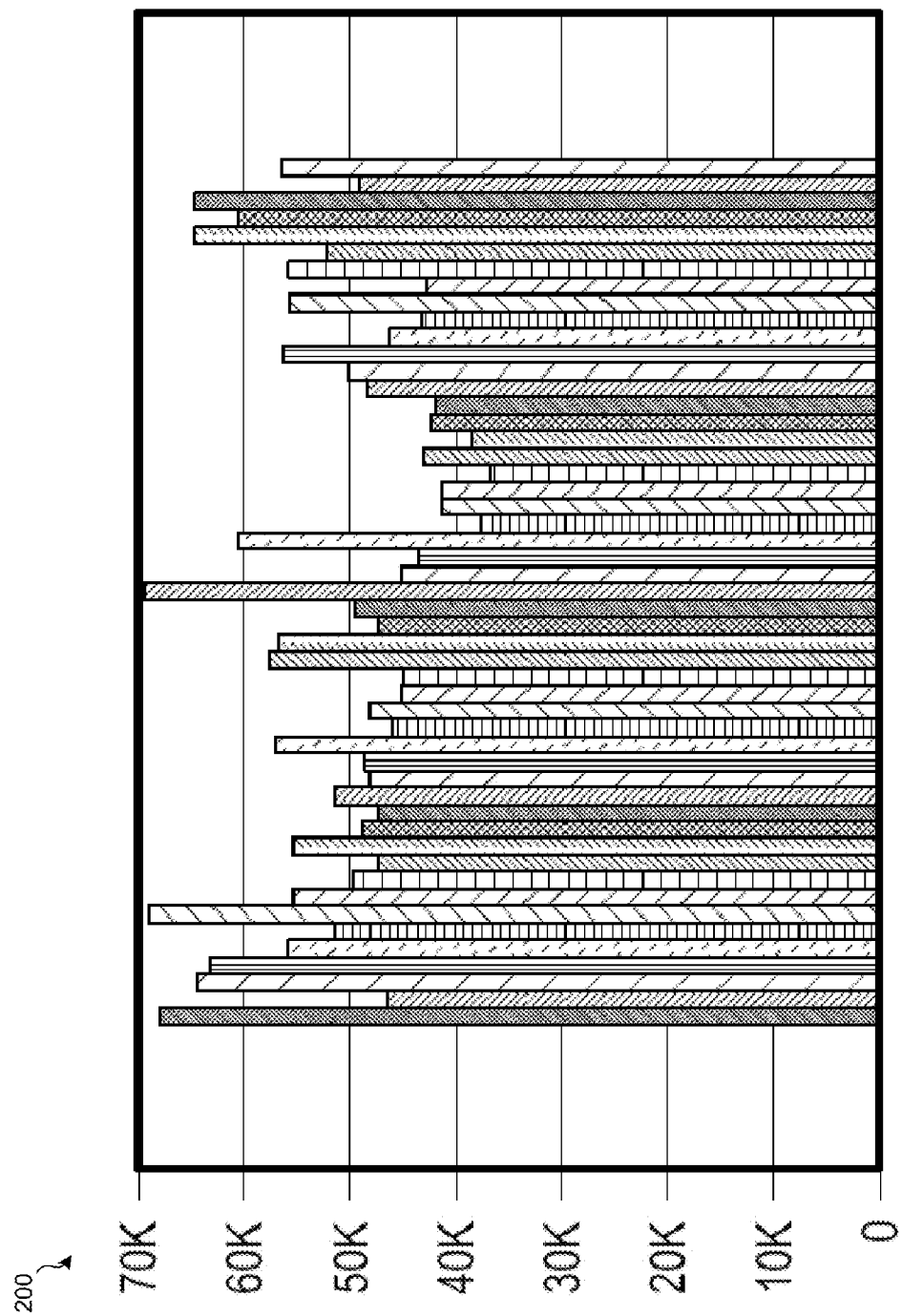
FIG. 2 illustrates an embodiment of a first data visualization.

FIG. 2 illustrates an embodiment of a first data visualization 200. In this example, the first data visualization is a bar chart. Collectively, the bars of the bar chart of FIG. 2 may represent a dataset. Each bar may represent a piece of data. In FIG. 2, each bar is a shape (a rectangle). Each bar of FIG. 2 corresponds to a piece of data for a particular state of the United States. As an example, each bar may be defined as a separate general path. As such, in this data visualization, each general path may be understood as having only a single subpath. While FIG. 2 illustrates a bar chart, this is for example purposes only. It should be understood that the shapes to be transitioned are arbitrary; that is, for the purposes of the embodiments detailed herein, the shapes used to represent pieces of data can be a wide variety or, even more generally, any shape.

Figure 3:
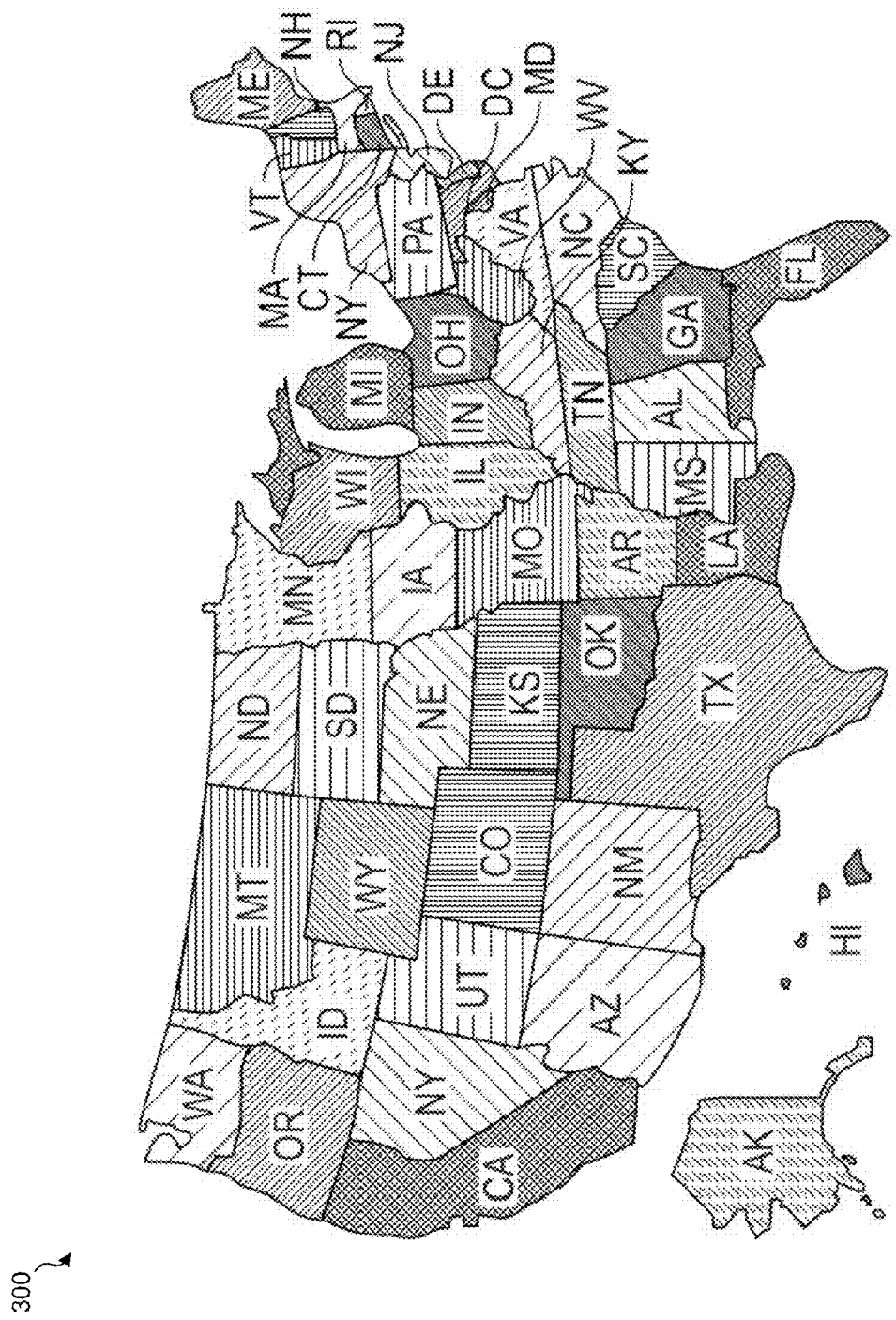
FIG. 3 illustrates an embodiment of a second data visualization of the same data as represented in FIG. 2.
Figure 4A:
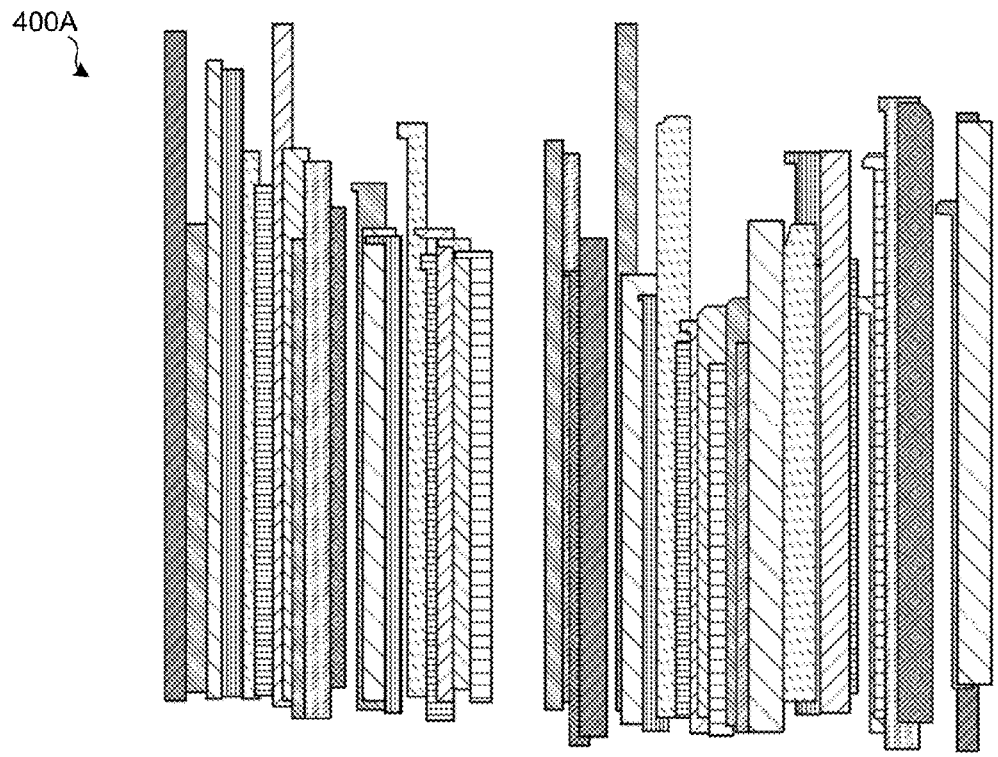
FIGS. 4A-4D illustrate embodiments of the transition from the first visual representation of data of FIG. 2 to the second visual representation of FIG. 3.
Figure 4B:
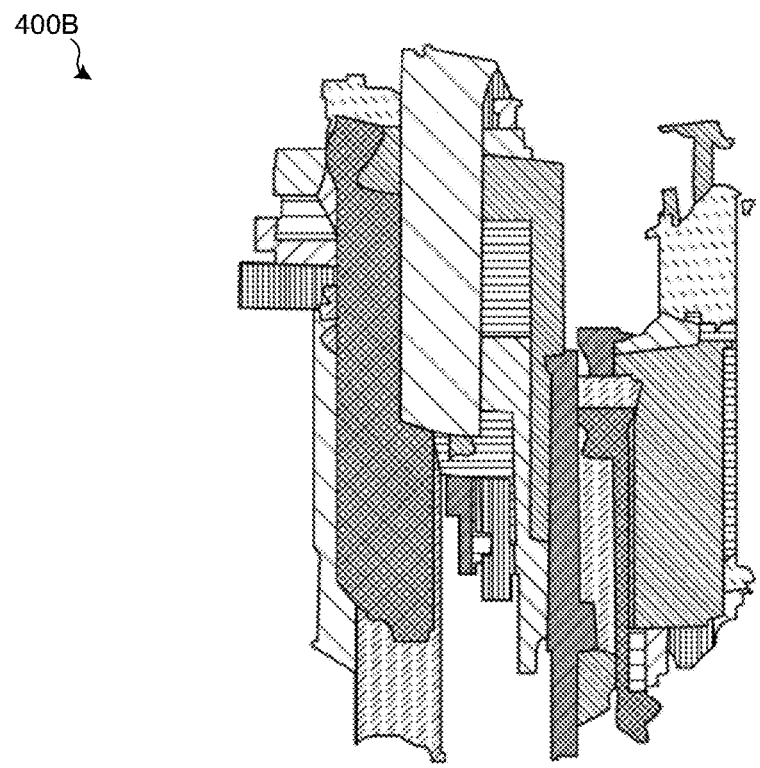
Figure 4C:
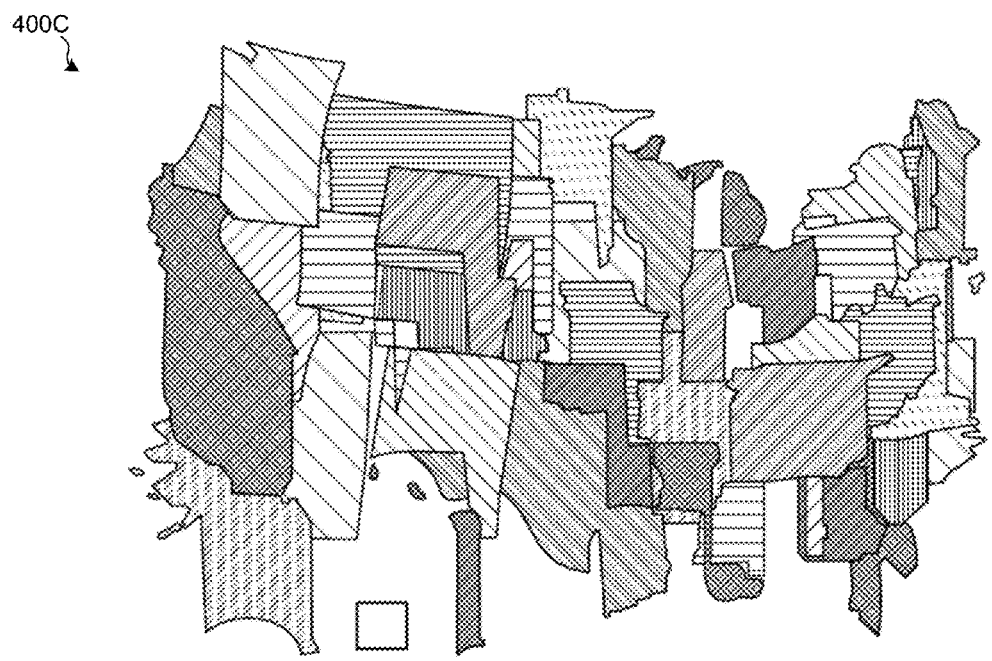
Figure 4D:
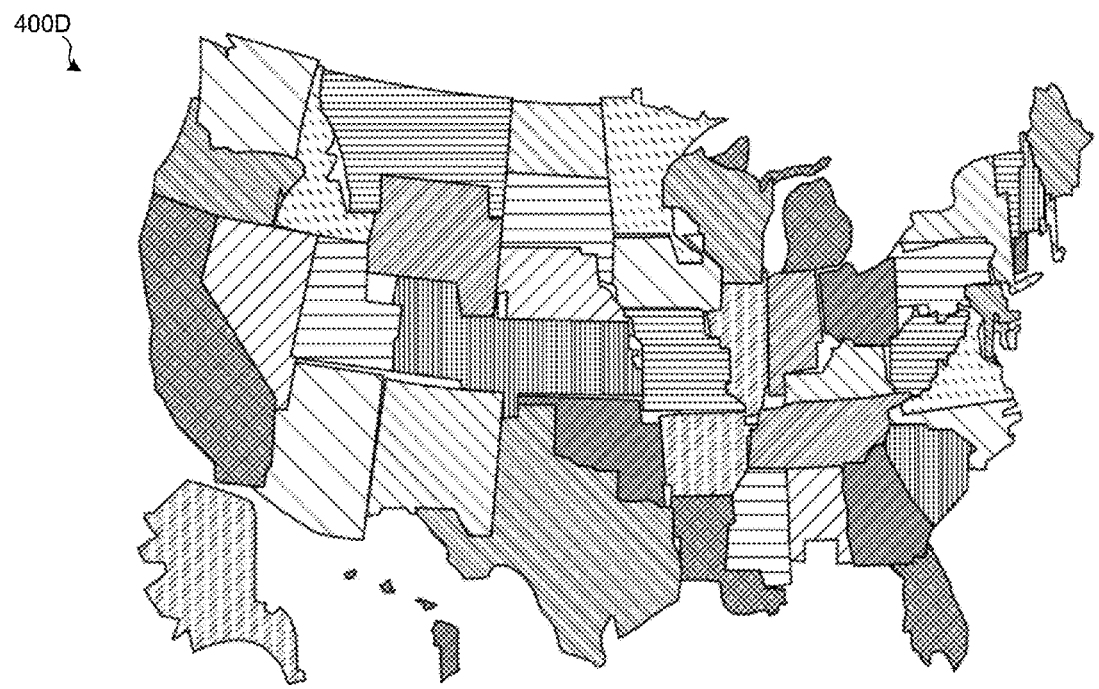

Via visual representation selector 105, a user may specify a second data visualization to be presented instead of the first data visualization, or such a transition between visualizations may be triggered without user input (e.g., after an amount of time elapsing). Both the first and second data visualizations may represent (at least a portion of) the same data, but in different visual formats. For the purposes of an exemplary description, a user has selected that the bar chart of FIG. 2 be converted into a map of the United States. FIG. 3 illustrates an embodiment of a second data visualization. In this example, the second data visualization is a map of the United States. Each state may represent a piece of data from the same dataset as the bar chart; as such, each bar of the bar chart of FIG. 2 may correspond to a particular state of the map of FIG. 3. In FIG. 3, each state is a shape (with some states, such as Alaska and Hawaii, being shapes composed of multiple drawing objects). In FIG. 3 each state may represent a separate general path. A state such as Hawaii or Alaska, which has several distinct islands, may include multiple subpaths in its general path such that the islands can be drawn distinct from each other. While FIG. 3 illustrates a map of the United States, this is for example purposes only. It should be understood that the shapes are arbitrary; that is, for the purposes of method 500 and system 100, the shapes used to represent pieces of data can be a wide variety or, even more generally, possibly any shape. The shapes of FIG. 3 may be stored as a series of commands that can be used to draw the shape. Such commands may be stored as part of second set of shapes 114. Therefore, drawing commands for the first set of shapes 112 are stored (e.g., using a non-transitory computer-readable medium) by system 100A and the second set of shapes 114 is also stored by system 100. While the definitions of the shapes are illustrated as part of system 100A, it should be understood that shape data may be stored external and made accessible to system 100A.

The transition from the data visualization of FIG. 2 to the data visualization of FIG. 3 is illustrated in FIGS. 4A-4D. As such, systems 100A and application 100B may be used to cause an output animation to transition from FIG. 2 to FIG. 4A, to FIG. 4B, to FIG. 4C, to FIG. 4D, to FIG. 3. The morphing animation as output may contain significantly more transition frames than illustrated in FIGS. 4A-4D such that the animation appears smooth to an observing user. For example, fifty frames may be used to transition from the data visualization of FIG. 2 to the data visualization of FIG. 3. Each bar of FIG. 2 may be morphed into the corresponding state to which the bar corresponds. This morphing transition may be performed in accordance with system 100A, application 100B, and the methods detailed herein. Such a morphing may also be performed in reverse, such as from the states of FIG. 3 to the bar chart of FIG. 2. It is stressed that the shapes used in FIGS. 2-4 are arbitrary; therefore a wide variety of shapes can be morphed into another wide variety of shapes in accordance with the systems detailed in FIGS. 1A and 1B and the method discussed in relation to FIGS. 5 and 6.

Figure 5:
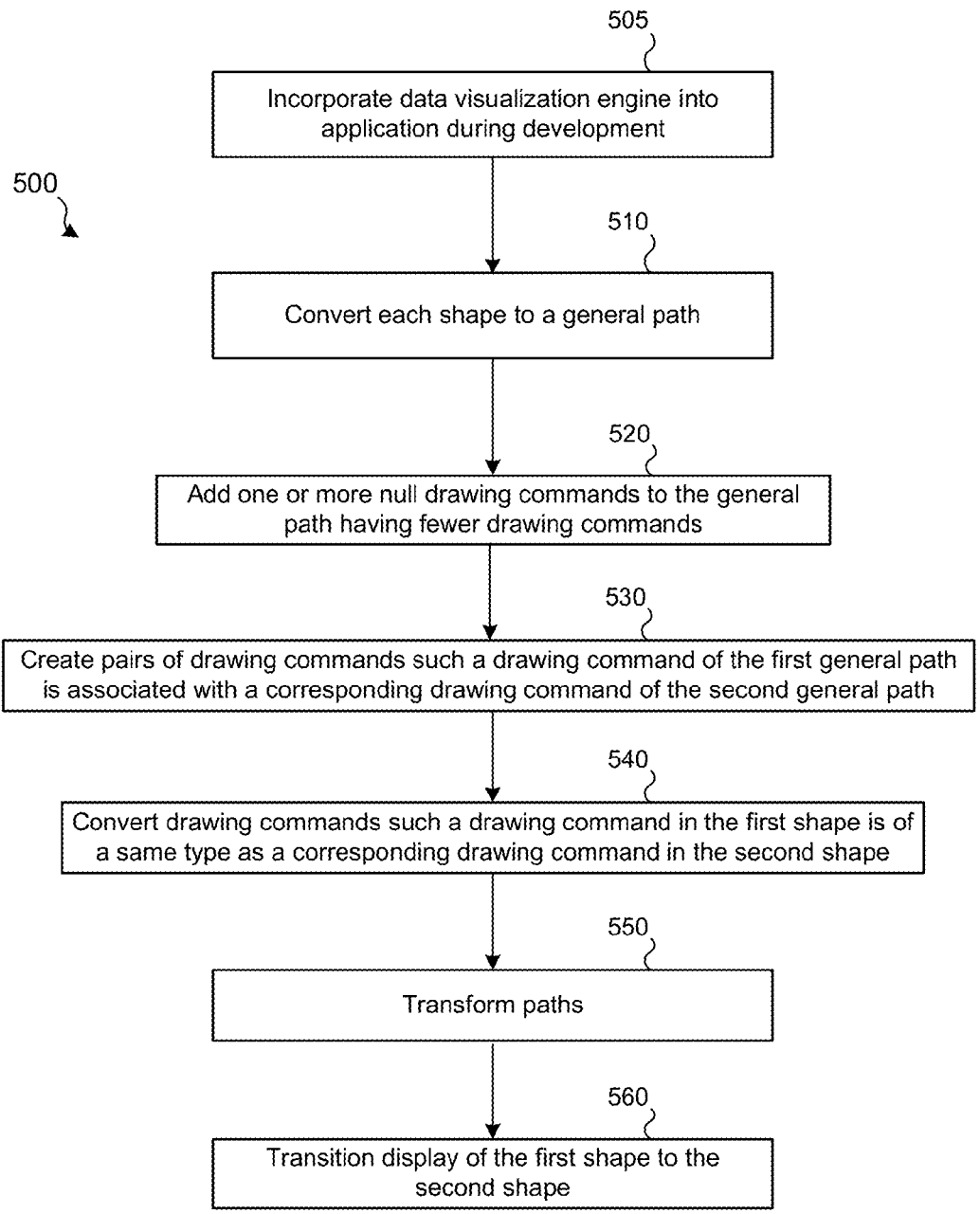
FIG. 5 illustrates an embodiment of a method for transitioning presentation of a first shape to presentation of a second shape.

Various methods may be performed using the systems of FIGS. 1A and 1B to perform animated graphical transformations, such as exemplified in FIGS. 2-4D. FIG. 5 illustrates an embodiment of a method 500 for transitioning presentation of a first shape to presentation of a second shape. Method 500 may be performed using system 100A and/or application 100B of FIGS. 1A and 1B, respectively. Method 500 may be performed for an application that is being developed and/or executed remotely. That is, method 500 may be performed by a user interacting with a web-based server via a network and an end-user terminal, such as discussed in relation to FIG. 7. Alternatively, the computer system used to develop the application and/or execute the compiled application may be local to the user, such as a user or developer directly interacting with the computer system of FIG. 9. Each step of method 500 may be performed by a computer system. Specifically, each step of method 500 may be executed by a computer system configured to include systems 100A and, possibly, application 100B that is in the form of software being executed on underlying hardware. Such systems may also be implemented directly as firmware or special-purpose hardware. The embodiments of method 500 discussed below focus on SVG and/or Java-based commands. It should be understood that such embodiments may be applicable to other programming languages also.

At step 505, a data visualization engine may be incorporated into an application under development. Such a data visualization engine may represent that of FIG. 1A. A data visualization engine may be configured to cause a first arbitrary shape to graphically morph into a second arbitrary shape as an animation output for presentation to one or more users. The data visualization engine may be a pre-built software component. That is, the data visualization engine may have been developed, tested, and distributed by an entity that provides a development environment, such as Oracle's® JDeveloper® that facilitates applications being built using the Java™ programming language. Embodiments may be applicable to other application development environments and languages too. A developer may incorporate the pre-built data visualization engine into an application that the developer is coding. The pre-built data visualization engine may be instantiated by the developer such that the data visualization engine will be compiled as part of the application. Once compiled, the application may include the data visualization engine and may use the data visualization engine for outputting visualizations of data generated and/or accessed by the compiled application.

At step 510, a first shape and a second shape may be accessed. The first shape represents the shape being transitioned from; the second shape represents the shape being transitioned to from the first shape. For each shape, a set of coordinates, pixel definitions, vectors, drawing commands, or some other representation may exist that are used to draw the corresponding shape. The drawings instructions for the first shape and the second shape may be converted into a first general path and a second general path, respectively. In some embodiments, one or both of the first and second shapes may already be in the form of a general path. A general path is a series of drawing commands that can be used to create a shape. For instance, in a particular programming language, common drawing commands that may be used to create a shape include a "LineTo" command, a "CubicCurveTo" command, and a "QuadraticCurveTo" command, an ellipse command, etc. If a shape is a polygon, the shape may be expressed as a general path that includes a series of one or more "LineTo" commands. While these drawing commands may be specific to scalable vector graphics (SVG), it should be understood that other forms of expression may have analogous drawing commands. For instance, a "LineTo" command of SVG may correspond to a command of another programming language that results in a line being drawn. Similar corollaries may exist for other drawing commands.

At step 520, the first and second general path may be modified to contain the same number of drawing commands. Method 500 assumes that each general path does not contain any subpaths, but rather each shape is a single, continuous drawn shape. Method 600 discloses how subpaths may be handled. It may be identified which general path has the greatest number of drawing commands. The other general path may have null drawing commands added such that each general path has the same number of drawing commands. If the first and second general paths happen to have the same number of drawing commands, no addition of null drawing commands may be necessary. Therefore, following step 520, the two general paths have the same number of drawing commands.

The adding of null drawing commands of step 520 may be performed in multiple ways. A general path can be padded with null drawing commands by inserting the additional null drawing commands at the beginning or end of the general path. The additional null drawing commands may also be distributed throughout the drawing commands of the general path. Distribution of null drawing commands may be performed uniformly throughout the general path. For instance, an index number within the general path may be used to determine how additional null drawing commands should be distributed. However, if a general path contains a drawing command that results in the drawing of a long segment and several shorter segments, for a smoother transition it may be desirable to cluster the null drawing commands before and after the longer segment. In some embodiments, if a drawing segment defined by a drawing command longer than a predefined distance threshold is present in the general path to receive null drawing commands, the segment may be broken into several segments (and thus be represented by multiple drawing commands), thus allowing null drawing commands to be inserted among the several segments. The null drawing commands do not affect the drawing of the shape. For the remainder of method 500, these null drawing commands may be treated as other drawing commands within each general path.

At step 530, individual pairs of drawing commands from the first and second general paths may be matched with each other. More specifically, a first drawing command from the first general path is matched with a drawing command from the second general path. The drawing commands may be paired in order; for example, the first drawing command of the first general path can be paired with the first drawing command of the second general path, the second drawing command of the first general path can be paired with the second drawing command of the second general path, and so on.

Once pairs of drawing commands have been determined, each pair of drawing commands may be modified, as necessary, such that each drawing command of the pair are of the same type of drawing command at step 540. For example, a pair of drawing commands, if possible, may be modified such that each drawing command of the pair is a "lineto" drawing command (or, more generally, results in a line being drawn). To make each pair of drawing commands match in type, several substeps may be performed, as detailed below.

If the types of drawing commands in the pair already match, no additional steps to alter the matching drawing commands may be necessary. If one of the drawing commands of the pair is a previously-inserted null drawing command, the null drawing command may be set or modified to be the type of drawing command of the other drawing command of the pair. If the paired drawing commands are different (and at least one of the paired drawing commands is not a null drawing command), if possible, the simpler drawing command may be converted into the more complex drawing command. For example, if a pair of drawing commands includes a "LineTo" (line drawing) command and a "CurveTo" (arc or curve drawing) command, the "LineTo" command may be converted to a "CurveTo" command, set with zero curve (e.g., by having a control point of the curve placed on the line). As another example, a "QuadraticCurveTo" (curve defined by a quadradic equation) command may be converted to a "CubicCurveTo" (curve defined by a cubic equation) command. For such a conversion, the "QuadraticCurveTo" command may be set to a "CubicCurveTo" command with coincident control points. If it is not possible or efficient to convert a first type of command into a second type of command, a process as detailed in relations to equations 1 and 2 may be performed.

At step 550, each general path may be transformed. If the first and second shape corresponding to the first general path and the second general path are nested in a display list and affected by one or more matrix transformations, the shapes can be preparented to a common parent and each general path transformed by a concatenated transformation matrix from the common parent to the original location in the display list. This step may be understood as putting all the paths into a same coordinate system. For example, if two squares are drawn from (0,0) to (10,10), a transformation matrix can be applied to one of them to translate it to (50,50), so it appears on screen to be drawn from (50,50) to (60,60). The intrinsic coordinates of this square are still from (0,0) to (10,10) within their own coordinate system. The transformation matrix translated that whole coordinate system. If morphing is between these two squares, their internal coordinates are still identical, but they appear in different locations on screen to the user. The transformation matrix can be removed from the second square and instead applied to the coordinates of its path, thereby modifying the path itself. Now the path coordinates contain the translation information. So, we have one square drawn from (0,0) to (10,10) and another square drawn from (50,50) to (60,60), and we can morph between them.

Following performance of such steps of method 500, the general path for the first and/or the second shape may be modified. However, the modified first general path and the modified second general path may each still result in the same final shapes being drawn as the unmodified commands stored before the detailed steps were performed. Rather, the modified general paths may facilitate a graphical transition between the first shape and the second shape.

At step 560, the visual transition from the first shape to the second shape may be output for presentation to the user. The output of the animated transformation may involve morphing each drawing command from the first general path into the paired drawing command from the second general path. For instance, this may involve a linear transition of each set of coordinates present in the first drawing command to the coordinates of the second drawing command. As an example, if a first drawing command is a "lineto" command from coordinates (0,0) to (0,10) and the paired, second drawing command is a "lineto" command from coordinates (10,0) to (10,5), the transition may, for example, involve outputting for display a transition that includes lines from: (2,0) to (2,9), (4,0) to (4,8), (6,0) to (6,7), and (8,0) to (8,6). After such a transition, the second drawing command using coordinates (10,0) to (10,5) may be output for presentation. Such a transition may be performed for each pair of drawing commands in the first general path and the second general path.

While such morphing is occurring, the shape may move from the location of the first shape to the location of the corresponding second shape (e.g., on the basis of the transition of the coordinates used in the drawing commands). The user may be able to initially view the first shape, then may view the transformation. After viewing the transformation, the user may view the final, second shape. The entire transition may take a second or less. The length of time of the transition may be customized by the developer. Similarly, the number of frames used to present the transition may be customized by the developer.

Method 500 is focused on morphing a first shape that is defined by a general path having a single subpath to a second shape that is defined by a second general path as having a single subpath. A general path can be understood as having at least one subpath. Method 600 represents a more in-depth method that can be used when multiple subpaths are present. Further, method 600 represents a more detailed method that may be used to transition between a first and second shape. Methods 500 and 600 may be used to transition multiple shapes during a single animation, such as presented in FIGS. 4A-4D.

Figure 6A:
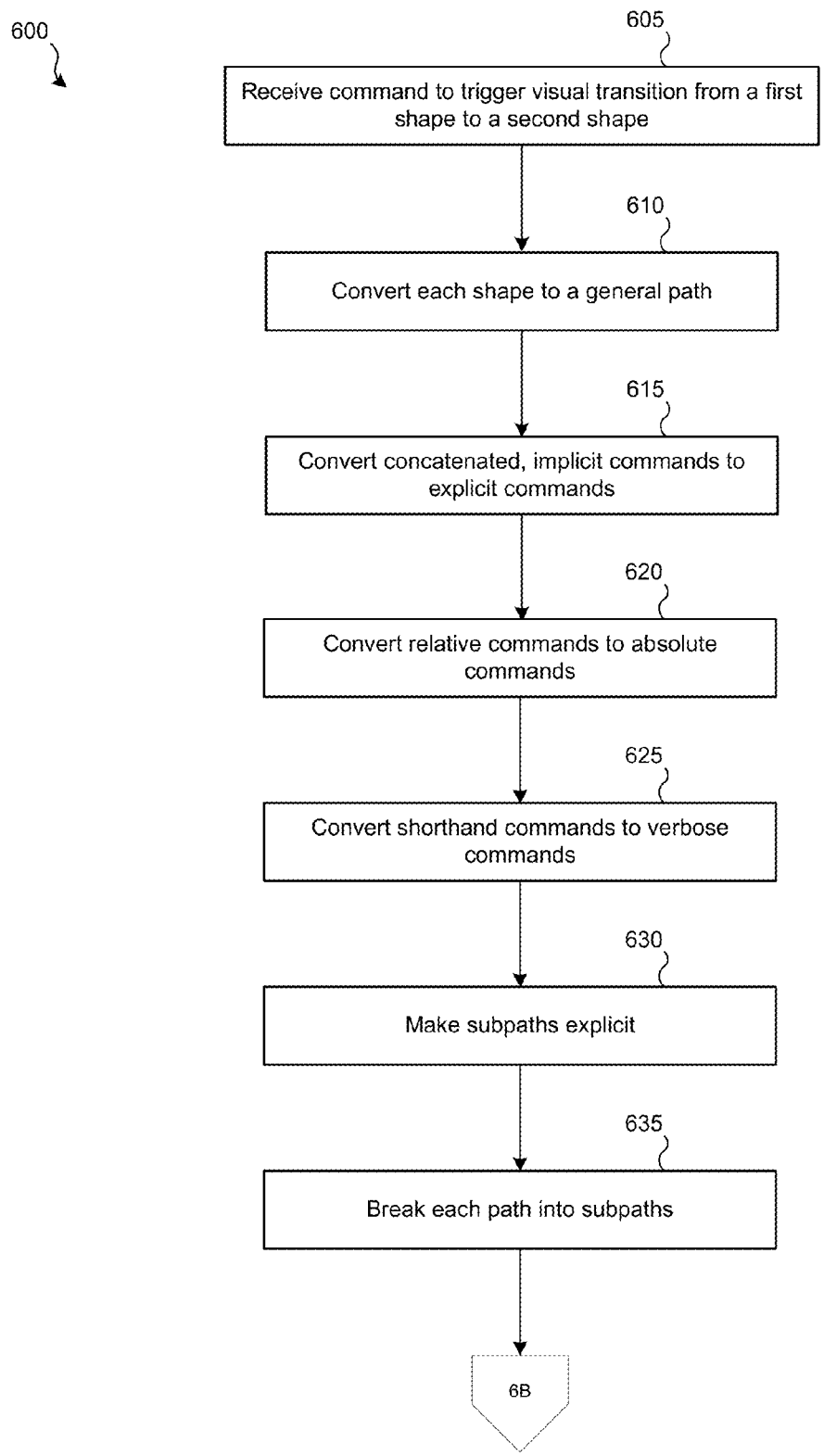
FIGS. 6A and 6B illustrate an embodiment of a method for transitioning a first shape to a second shape.
Figure 6B:
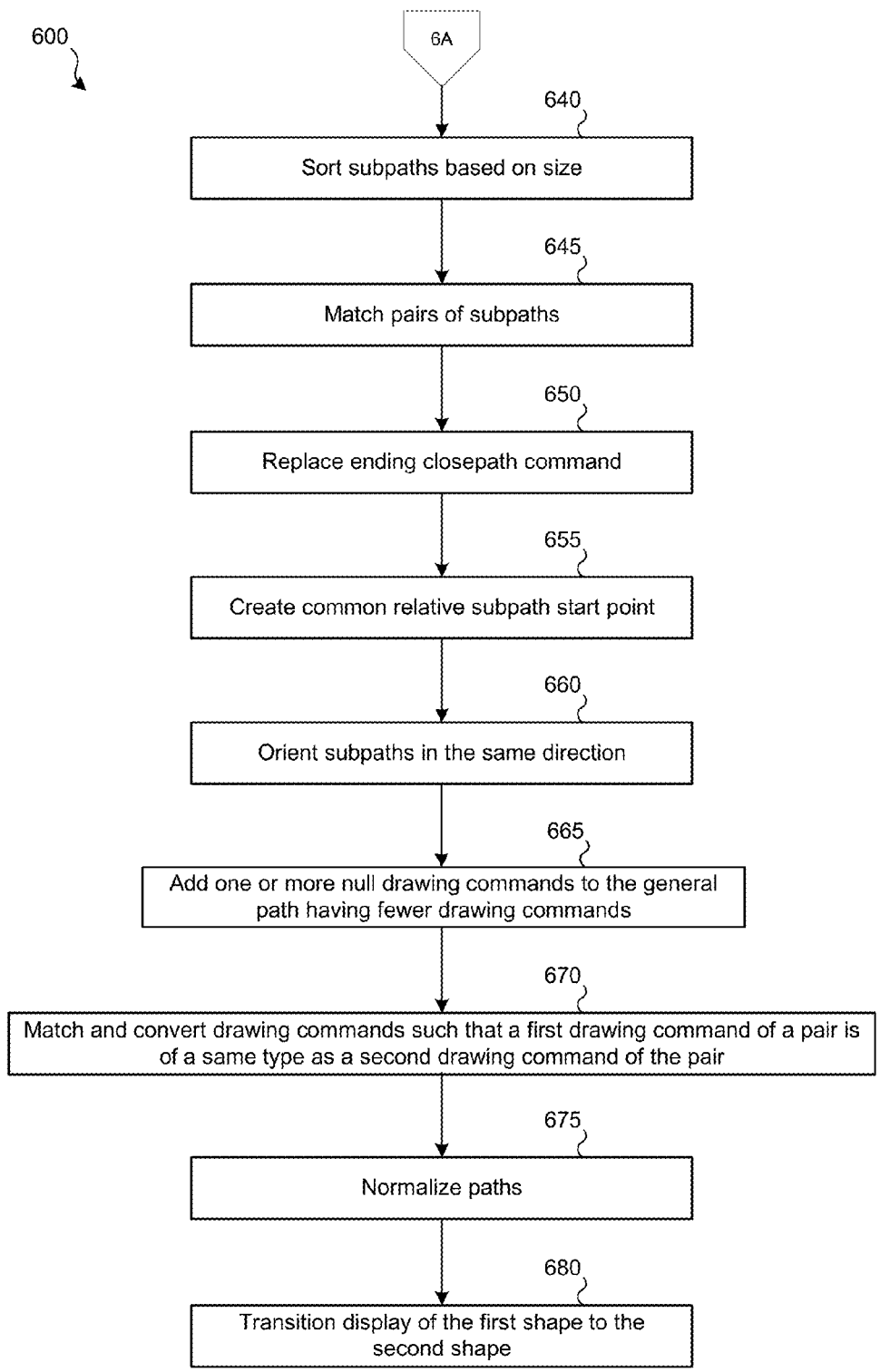

FIGS. 6A and 6B illustrate an embodiment of a method 600 for transitioning presentation of a first shape to presentation of a second shape. The first and second shapes may be arbitrary and multiple shapes may be transitioned concurrently. Method 600 may be performed using system 100A and/or application 100B of FIGS. 1A and 1B, respectively. Method 600 may be performed for an application that is being developed and/or executed remotely. That is, method 600 may be performed by a user interacting with a web-based server via a network and an end-user terminal, such as discussed in relation to FIG. 7. Alternatively, the computer system used to develop the application and/or execute the compiled application may be local to the user, such as a user or developer directly interacting with the computer system of FIG. 9. Each step of method 600 may be performed by a computer system (or multiple computer systems). Specifically, each step of method 600 may be executed by a computer system configured to include systems 100A and, possibly, application 100B that is in the form of software being executed on underlying hardware. Such systems may also be implemented directly as firmware or special-purpose hardware. The embodiments of method 600 discussed below focus on SVG-based commands. It should be understood that such embodiments may be applicable to other programming languages also. Method 600 may represent a more detailed embodiment of method 500. For instance, method 600 may allow for the handling of multiple subpaths that are part of a general path.

Prior to method 600 commencing, a step such as step 505 of method 500 may be performed. Step 505 may be performed using a different computer system than the steps used to perform the remainder of method 600. That is, a developer may use a separate computer system to develop an application that incorporates a data visualization engine than the computer system used by an end user to execute such an application. Alternatively, the same computer system may be used by both the developer and the end-user.

At step 605 of FIG. 6A a command is received that triggers a visual transition (e.g., an animation including morphing) from a first shape to a second shape. For instance, the command may be based on a user selecting, via visual representation selector 105, that a data set is to be presented as a second data visualization instead of a first data visualization, which may currently be output for presentation to the user via a display device. For the exemplary description herein, the user has selected that the bar chart of FIG. 2 is to be instead presented as the map of FIG. 3. This user selection serves as the command of step 605 of method 600. In other embodiments a trigger other than user input may initiate the transition. For instance, a time period expiring or other form of trigger may cause the animated transition to be presented to user.

For the remainder of the description of method 600, the transition of a first shape to a second shape is detailed. Referring to the examples FIGS. 2, 3, and 4A-4D, the first shape corresponds to a single bar of the bar chart and the second shape corresponds to a single, corresponding state of the map. It should be understood that system 100A, application 100B, and methods 500 and 600 may be used to perform such a transition for many shapes (e.g., each bar of the bar chart and each state of map) such that the transition as presented to the user transitions each shape over a same time period and for transitions between arbitrary shapes.

At step 610, definitions of both the first shape and the second shape may be accessed. At step 610, the first shape and the second shape may be converted into a first general path and a second general path, respectively. Alternatively, the shapes may be stored and accessed in the form of scalable vector graphics (SVG) general paths. As such, determining a first and second general path can include accessing, loading, and/or creating the general paths. In reference to FIG. 1A, this step may be performed by general path creation engine 110. In some embodiments, one or both of the first and second shapes may already be in the form of a general path. A general path is a series of drawing commands that can be used to create a shape. The drawing commands may be specific to SVG. It should be understood that other forms of expression may have similar types of drawing commands.

At step 615, any concatenated implicit drawing commands of each general path may be converted to explicit commands within each general path. For various drawing commands, if a single drawing command is followed by a plurality of sets of coordinates, the drawing command may be interpreted to be repeated for each of the provided coordinates. For both the first shape and second shape, each such instance of an implicit drawing command may be converted to an explicit command for each set of coordinates. Therefore, for example, if a single "LineTo" command was associated with multiple sets of coordinates, individual "LineTo" commands may be implemented for each instance of coordinates. By modifying implicit commands to be explicit, each drawing command of each general path of the first and second shape may be implemented independently of other drawing commands. Step 615 may be performed by a command composition engine such as command composition engine 115 of system 100A.

At step 620, relative drawing commands, if any, of both the first general path of the first shape and the second general path of the second shape may be converted to absolute drawing commands. A relative drawing command may rely on coordinates relative to a previous performed drawing command. For example, following a previous drawing command, a current location may correspond to coordinates (x,y). Without the previous drawing command being executed, it may be difficult to determine coordinates (x,y). By converting each drawing command into absolute drawing commands, the drawing commands can be performed independently of other drawings commands. As such, following step 620, one or more drawing commands of the first general path and/or the second general path may be modified. Step 620 may be performed by a command composition engine such as command composition engine 115 of system 100A.

At step 625, shorthand drawing commands, if any, may be converted to verbose drawing commands for the first and second general paths. Certain commands, such as "HorizontalLineTo" or "VerticalLineTo," may represent shorthand commands for implementing horizontal and vertical lines, for example. Such commands may be converted to a more general command, which may require additional coordinates. For instance, "HorizontalLineTo" or "VerticalLineTo" commands may be converted to "LineTo" commands that specify starting and ending coordinates. Step 625 may be performed by a command composition engine such as command composition engine 115 of system 100A.

At step 630, any subpaths, if present, of each general path may be made explicit. A general path may include one or more commands that close the drawing of a shape, such as a "ClosePath" command (which closes a shape). If multiple closepath drawing commands are present within a general path, the general path may be understood to have multiple subpaths. If only a single "ClosePath" command is present, a general path can be understood to have only a single subpath. Each subpath may be modified to begin with an explicit move command, such as a "MoveTo" command. Such a "MoveTo" command may permit drawing commands of the subpath to be performed independent of other drawing commands that are part of another subpath of the same general path. Step 630 may be performed by a subpath processing engine such as subpath processing engine 120 of system 100A.

At step 635, each path of each general path may be broken into its subpaths. Therefore, each path within a general path for a shape is broken into individual paths. Such breaking allows each subpath to be drawn independently of other paths and subpaths. While the previous step makes subpaths explicit within the containing general path, step 535 may break a general path into its constituent subpaths. As such, these subpaths can be treated independently of each other outside of the containing general path. Therefore, subpaths, following step 635, may be separate shapes. Step 635 may be performed by a subpath processing engine such as subpath processing engine 120 of system 100A.

Method 600 continues on FIG. 6B. At step 640, subpaths of the general path may be sorted based on size of the shape drawn by the subpath. The size of each subpath may be defined based on the magnitude of an area drawn by drawing commands of the subpath, a length of a perimeter defined by the drawing commands of the subpath, or some other calculable value for the subpath. By sorting each subpath based on size, a largest subpath of the general path of the first shape may be paired with the largest subpath of the second shape, and so on. This arrangement may allow for the largest object of the first shape to be morphed into the largest object of the second shape. Therefore, following step 640 of method 600, the general path for the first shape and the general path for the second path may each have its subpaths ordered from largest to smallest (or smallest to largest). Step 640 may be performed by a subpath processing engine such as subpath processing engine 120 of system 100A.

For the first and second shape, a same number of subpaths may be desired to be present in each of the first and second general paths. If the first general path and the second general path each have the same number of subpaths, no further processing may be necessary at step 645; as an example, commonly both the first and second general path may each have only one subpath. If either the first general path or the second general path has fewer subpaths than the other general path, an appropriate number of empty subpaths may be added to the general path having the fewer number of subpaths. For example, if the first general path has three subpaths and the second general path has one subpath, two empty subpaths may be added to the second general path. An empty subpath refers to a subpath that does not contain any drawing commands or any drawing commands that result in a line or curve being drawn. An empty subpath may be appended within a general path before or after a non-empty subpath without affecting the appearance of the shape created based on the general path. Once each general path has the same number of subpaths, the subpaths are paired off, such that each pair includes a subpath from each general path. The pairs are created based on the sizing ordering of step 640. For example, the subpath of the first general path that draws the largest shape of the first general path may be paired with the subpath of the second general path that draws the largest shape of the second general path. Following step 645, each subpath of the first general path is paired with a subpath of the second general path. If one of the general paths (prior to step 640) had a greater number of subpaths than the other general path, the pairing would result in a subpath of one of the general paths being paired with an empty subpath of the other general path. In some embodiments, empty subpaths of a general path are paired with subpaths that draw the smallest shape in other general path. Step 645 may be performed by a subpath processing engine such as subpath processing engine 120 of system 100A.

At step 650, commands that close ("ClosePath") drawing paths may be replaced by another form of drawing command, such as a line to ("LineTo") command. A "ClosePath" command may serve to draw a line from a current coordinate to a coordinate from which a subpath began being drawn. An explicit "LineTo" command may be used to replace the "ClosePath" command. It should be understood that a command other than a "LineTo" command may be used to replace a "ClosePath" command. Step 650 may be performed by a subpath processing engine such as subpath processing engine 120 of system 100A.

At step 655, common relative subpath start points may be defined for each subpath of each general path. For each subpath pair (a subpath from the first general path and a matched subpath from the second general path), a same or similar relative start point may be used for each subpath. For instance, since a subpath may define a closed shape, the subpath may begin being drawn from any point along the subpath. A relative position, such as top-left, top-right, bottom-left, or bottom-right, may be used as a position from where each subpath should be defined. For instance, the minimum coordinates (x, y) of a subpath may be used to find the top left of a subpath (assuming that (0,0) is at the top left as in SVG). Once the predefined relative position is determined for each subset, the subpath may be split at that point. An initial "MoveTo" command (which defined where the subset of drawing commands would commence drawing) of the subset may be replaced with the coordinates of the predefined relative start position of the subpath and the drawing commands of the subset may be reordered to draw from the relative start position defined by the "MoveTo" command. Step 655 may be performed by a location and orientation engine such as location and orientation engine 125 of system 100A location.

At step 660, the ordering of commands for drawing subpaths of each general path may be oriented in the same direction. Since drawing commands are processed in order from a general path, it may be desirable for a common direction of either clockwise or counterclockwise (anticlockwise) to be used to draw each subpath of each general path. The orientation of subpath may be determined using a polygon that has vertices of coordinates along a subpath. The vector cross product of two adjacent edges sharing a common vertex on the convex hull of the polygon can indicate the orientation of the polygon. For instance, a vertex on a convex hull of the polygon can be found by looking for the minimum (x,y) coordinates of the polygon. If one or more subpaths result in drawing in opposite directions, the one or more subpaths of one or both of the general paths of the first shape and the second shape may be traversed from end to start, with coordinates and parameters adjusted accordingly. Step 660 may be performed by a location and orientation engine such as location and orientation engine 125 of system 100A location.

At step 665, each pair of subpaths may be modified to contain the same number of drawing commands. From each pair of subpaths, a subpath may be identified that has the greatest number of drawing commands. The other subpath may have null drawing commands added such that each subpath of the pair has the same number of drawing commands. If the paired subpaths happen to have the same number of drawing commands, no addition of null drawing commands may be necessary. Therefore, following step 665, each pair of subpaths has the same number of drawing commands. Step 665 may be performed by a path count engine such as path count engine 130 of system 100A location.

The adding of null drawing commands of step 665 may be performed in multiple ways. A subpath can be padded with null drawing commands by inserting the additional null drawing commands at the beginning or end of the subpath. The additional null drawing commands may also be distributed throughout the drawing commands of the subpath. Distribution of null drawing commands may be performed uniformly throughout the subpath. For instance, an index number within the subpath may be used to determine how additional null drawing commands should be distributed. However, if a subpath contains a long segment and several shorter segments, for a smoother transition it may be desirable to cluster the null drawing commands before and after the longer segment. In some embodiments, if a segment longer than a predefined distance threshold is present in the subpath to receive null drawing commands, the segment may be broken into several segments (and thus represented by multiple drawing commands), thus allowing null drawing commands to be inserted among the several segments. Each null drawing command does not affect the drawing of the shape. For the remainder of method 600 these null drawing commands may be treated as other drawing commands within each subpath.

At step 670, individual pairs of drawing commands may be matched. Previously, at step 645, each subpath from the first general path of the first shape was paired with a subpath from the second general path of the second shape. For each pair of subpaths, a drawing command in each subpath is matched with a drawing command in the other subpath. For example, the first drawing command of the first subpath is paired with the first drawing command of the second subpath, the second drawing command of the first subpath is paired with the second drawing command of the second subpath, and so on.

Once pairs of drawing commands have been determined, each pair of drawing commands may be modified, as necessary, at step 670 such that each drawing command of the pair are of the same type of drawing command. For example, a pair of drawing commands, if possible, may be modified such that each drawing command of the pair is a "lineto" drawing command. To make each pair of drawing commands match in type, several substeps may be performed, as detailed below.

If the types of drawing commands in the pair match, no additional steps to alter the matching drawing commands may be necessary. If one of the drawing commands of the pair is a previously-inserted null drawing command, the null drawing command may be set or modified to be the type of drawing command of the other drawing command of the pair. The null drawing command may be set to have a same starting and ending point so that it does not affect the shape of which its subpath is a part. If the paired drawing commands are different (and at least one of the paired drawing commands is not a null drawing command), if possible, the simpler drawing command may be converted into the more complex drawing command.

In some instances, it may not be feasible to change a first type of drawing command directly into a second type of drawing command. If such a situation is present, the drawing commands of the pair are referred to as non-analogous. For such instances of non-analogous drawing commands, a null drawing command may be inserted into each subset. As such, the non-analogous pair is altered such that each non-analogous drawing command is re-paired with inserted null drawing commands. A possible way of inserting such null drawing commands into each subset is listed below. Equations 1 and 2, as previously discussed, disclose how non-analogous drawing commands may be paired. As such, the x drawing command in the first subpath is paired with a newly-added null drawing command in the second subset and the y drawing command in the second subpath is paired with a newly-added null command in the first subpath. The x drawing command and the y drawing command may be kept in adjacent pairs of drawing commands. Each null drawing command is set to be of the type of the drawing command with which it is paired. Step 670 may be performed by a path count engine such as path count engine 130 of system 100A.

At step 675, each general path may be normalized. If the first and second shape corresponding to the first general path and the second general path are nested in a display list and affected by one or more matrix transformations, the shapes can be preparented to a common parent and each general path transformed by a concatenated transformation matrix from the common parent to the original location in the display list. This step may be understood as putting all the paths into a same coordinate system. If morphing is between these two squares, their internal coordinates are still identical, but they appear in different locations on screen to the user. The transformation matrix can be removed from the second square and instead applied to the coordinates of its path, thereby modifying the path itself. Now the path coordinates contain the translation information. So, we have one square drawn from (0,0) to (10,10) and another square drawn from (50,50) to (60,60), and we can morph between them. Step 670 may be performed by a transition engine such as transition engine 140 of system 100A.

Following performance of such steps of method 600, such as by system 100, the general path for the first and/or the second shape may be modified. However, the modified first general path and the modified second general path may each still result in the same final shapes being drawn as the unmodified commands stored before the detailed steps were performed. Rather, the modified general paths may facilitate a graphical transition between the first shape and the second shape. Therefore, the preceding steps may be performed prior to any transition being requested, such as at step 605.

At step 680, the visual transition from the first shape to the second shape may be output for presentation to the user. The output of the transformation of step 680 may involve morphing each drawing command from the first general path into the paired drawing command from the second general path. For instance, this may involve linearly transitioning each set of coordinates present in the first drawing command to the coordinates of the second drawing command. As an example, if a first drawing command is a "lineto" command from coordinates (0,0) to (0,10) and the paired, second drawing command is a "lineto" command from coordinates (10,0) to (10,5), the transition may, for example, involve outputting for display a transition that includes lines from: (2,0) to (2,9), (4,0) to (4,8), (6,0) to (6,7), and (8,0) to (8,6). After such a transition, the second drawing command using coordinates (10,0) to (10,5) may be output for presentation. Such a transition may be performed concurrently for each pair of drawing commands in each subpath of the first general path and the second general path.

While such morphing is occurring, the shape may be moved from the location of the first shape to the location of the corresponding second shape (e.g., on the basis of the transition of the coordinates used in the drawing commands). For example, referring to FIGS. 4A through 4D, as a bar is transitioned into a state, the location of the bar moves to the location of the state as the shape of the bar is morphed into the shape of the state. The user may be able to initially view the first shape, then may view the transformation. After viewing the transformation and the moving, the user may view the second shape (that is in the correct location). The entire transition may take a second or less. The length of time of the transition may be customized by the developer. Similarly, the number of frames used to present the transition may be customized by the developer.

Figure 7:
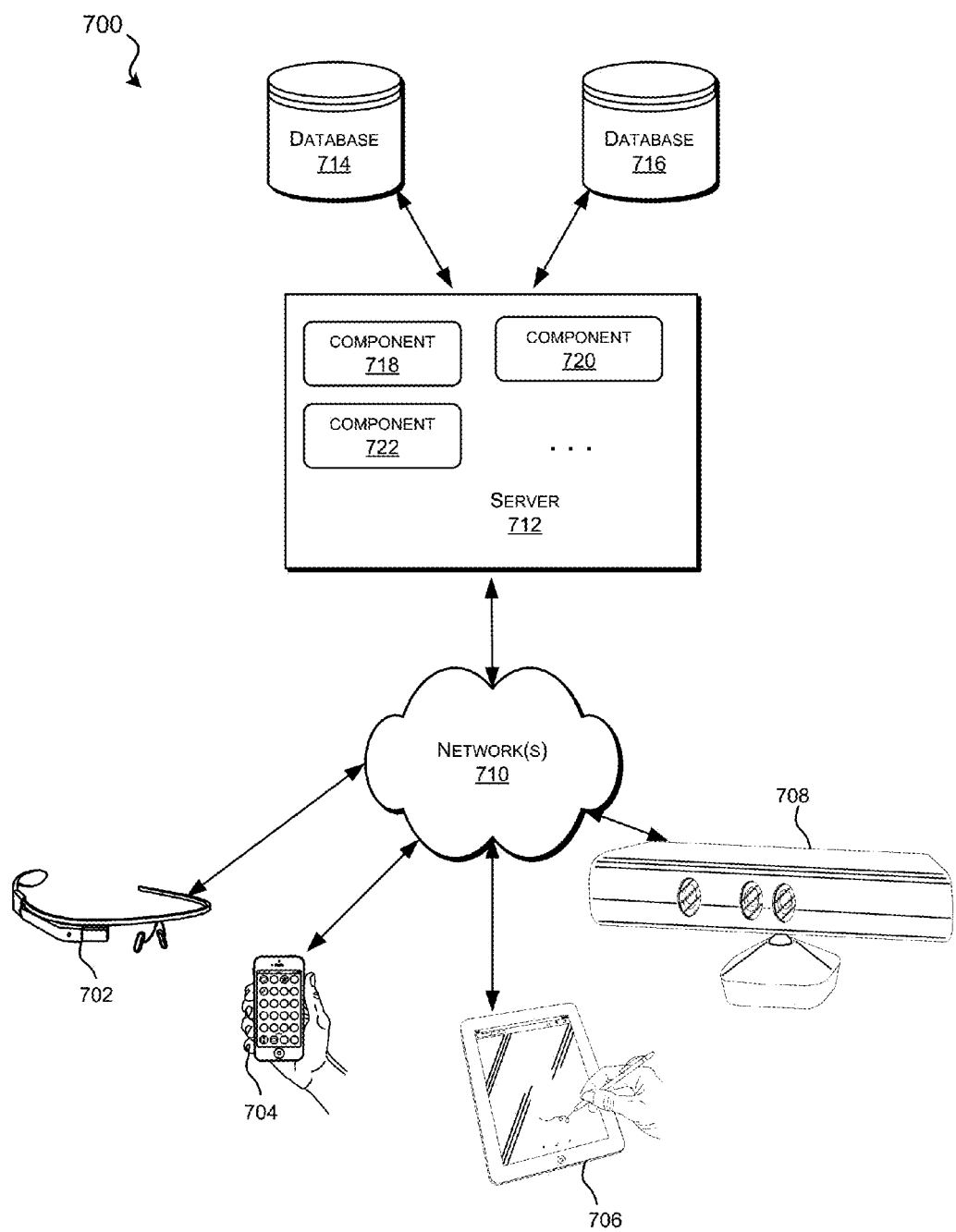
FIG. 7 illustrates an embodiment of a distributed system that permits the use of a data visualization system.
Figure 8:
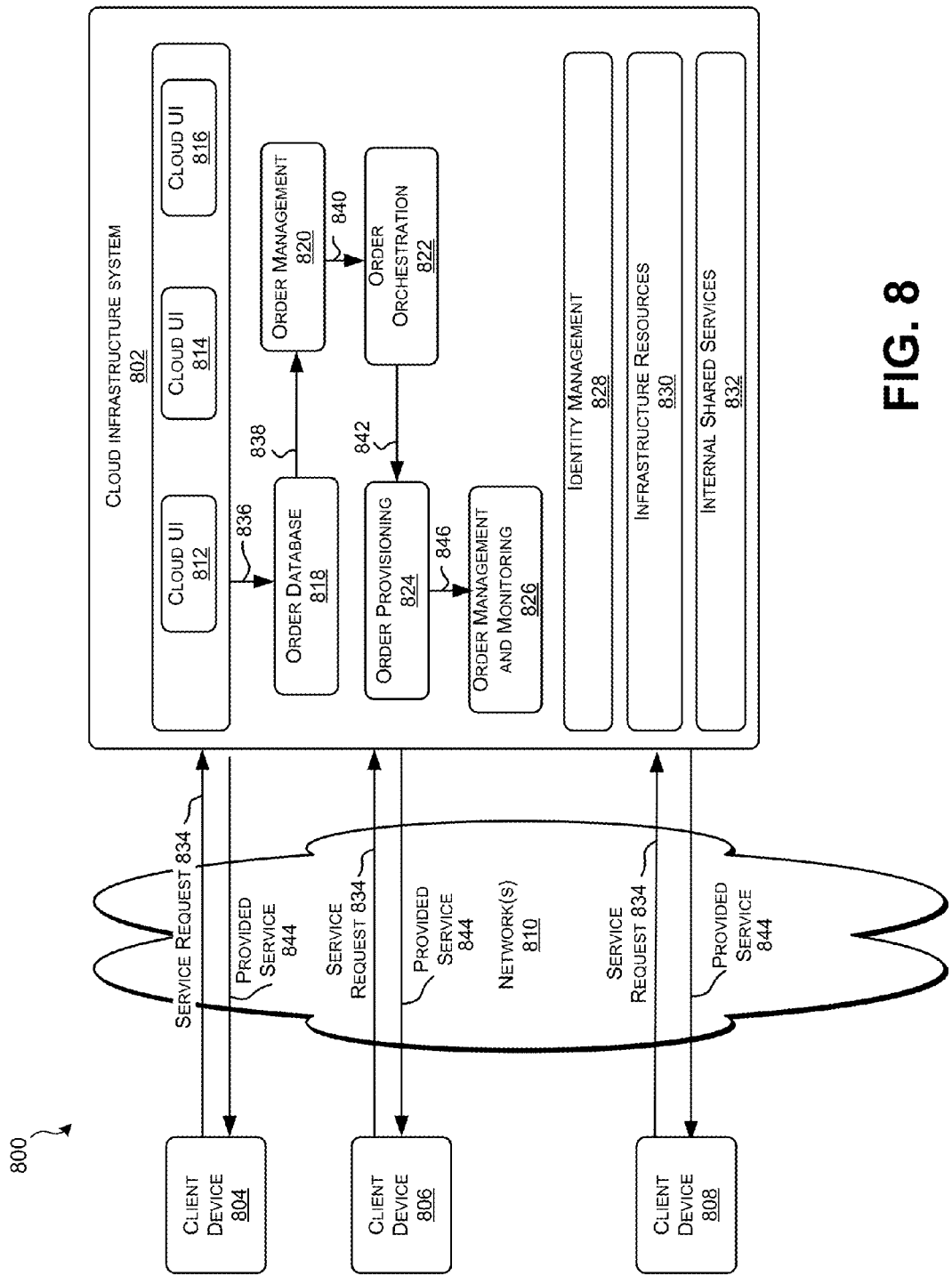
FIG. 8 illustrates an embodiment of a system environment by which services may be offered as cloud services.
Figure 9:
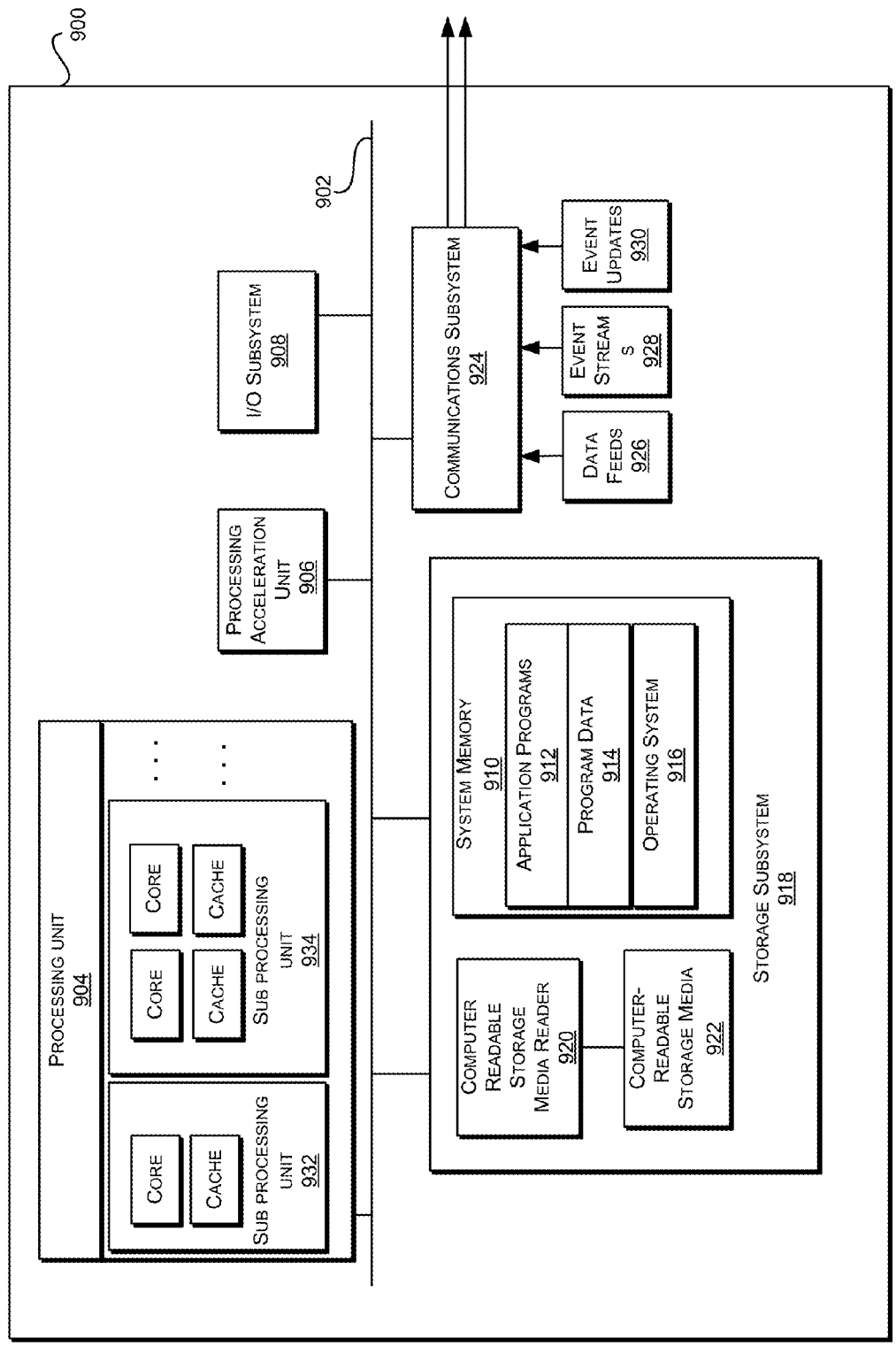
FIG. 9 illustrates an embodiment of a computer system, which may be used to implement various embodiments detailed herein.

FIGS. 7-9 provide additional details on how a distributed system may be implemented that allows user and developers to remotely interact with a web service computer system, which may be used for development and/or execution of an application involving a data visualization engine and one or more layout plug-ins. FIG. 7 illustrates an embodiment of a distributed system 700 that permits the use of a remote developer (or user) computer system. In the illustrated embodiment, distributed system 700 includes one or more client computing devices 702, 704, 706, and 708 (which may represent user and/or developer computer systems), which are configured to execute and operate a client application such as a web browser, proprietary client (e.g., Oracle® Forms), or the like over one or more network(s) 710. Server 712 (which may be the web service computer system) may be communicatively coupled with remote client computing devices 702, 704, 706, and 708 via network 710.

In various embodiments, server 712 may be adapted to run one or more services or software applications provided by one or more of the components of the system. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 (which may represent a development environment for the application or an instance of the application executing) of distributed system 700 are shown as being implemented on server 712. In other embodiments, one or more of the components of distributed system 700 and/or the services provided by these components may also be implemented by one or more of the client computing devices 702, 704, 706, and/or 708. Users/developers operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the figure is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 712 may be composed of one or more general purpose computers (e.g., it may be a distributed computing system), specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle®, that are adapted to store, update, and retrieve data in response to SQL-formatted commands.

FIG. 8 is a simplified block diagram of one or more components of a cloud infrastructure system 800 by which services provided by one or more components of an embodiment system may be offered as cloud services, in accordance with an embodiment of the present disclosure. In the illustrated embodiment, cloud infrastructure system 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle® Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Although exemplary cloud infrastructure system 800 is shown with three client computing devices, any number of client computing devices may be supported. Other devices such as devices with sensors, etc. may interact with cloud infrastructure system 802.

Network(s) 810 may facilitate communications and exchange of data between client computing devices 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system, is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle®) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client computing devices 804, 806, or 808, may interact with cloud infrastructure system 802 by requesting one or more services provided by cloud infrastructure system 802 and placing an order for a subscription for one or more services offered by cloud infrastructure system 802, such as execution of an application or an integrated development environment. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 800 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client computing devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.). Identity management module 828 may also include the management of descriptive information about each customer and about how and by whom that descriptive information can be accessed and modified.

FIG. 9 illustrates an exemplary computer system 900, in which various embodiments of the present invention may be implemented. Computer system 900 may be used to implement any of the computer systems described above, such as client computer systems, server systems, cloud host systems, etc. Specifically, one or more instances of computer system 900 may be used to execute development of an application and execution of an application that includes a data visualization engine and one or more layout plug-ins. As shown in FIG. 9, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible (non-transitory) computer-readable storage media 922 and a system memory 910. One or more instances of computer system 900 may be used to perform the methods described herein and/or execute any of the software systems previously detailed.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 9 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present invention.

Storage subsystem 918 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments, communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for transitioning between data visualizations, the method comprising:
    determining, by a computer system, a first general path that defines a first shape and a second general path that defines a second shape, wherein:
        the first shape and the second shape are different shapes,
        the first general path comprises a first plurality of drawing commands that define the first shape, and
        the second general path comprises a second plurality of drawing commands that define the second shape;
    creating, by the computer system, a plurality of pairs of drawing commands such that each pair of the plurality of pairs of drawing commands includes a first drawing command from the first plurality of drawing commands of the first general path and a second drawing command from the second plurality of drawing commands of the second general path;
    modifying, by the computer system, the plurality of pairs of drawing commands such that each pair of the plurality of pairs of drawing commands includes a single type of drawing command; and
    outputting, by the computer system for presentation, a transition between the first shape and the second shape using the modified plurality of pairs of drawing commands.

2. The method for transitioning between data visualizations of claim 1, the method further comprising:
    adding, by the computer system, at least one null drawing command to the second general path such that the first general path and the second general path each have a same quantity of drawing commands.

3. The method for transitioning between data visualizations of claim 1, the method further comprising:
    receiving, by the computer system, a command to trigger a visual transition of the first shape into the second shape, wherein the transition between the first shape and the second shape using the modified plurality of pairs of drawing commands is performed based on receipt of the command.

4. The method for transitioning between data visualizations of claim 1, wherein outputting the transition between the first shape and the second shape occurs as part of a transition of a first plurality of shapes to a second plurality of shapes, the first plurality of shapes including the first shape and the second plurality of shapes including the second shape.

5. The method for transitioning between data visualizations of claim 1, wherein modifying the plurality of pairs of drawing commands such that each pair of the plurality of pairs of drawing commands includes the single type of drawing command comprises, for a pair of drawing commands of the plurality of pairs of drawing commands:
    converting the first drawing command of the first general path to a type of the second drawing command of the second general path, wherein the first drawing command is eligible to be expressed as the type of the second drawing command.

6. The method for transitioning between data visualizations of claim 1, further comprising:

determining, by the computer system, a first direction in which the first general path defines drawing of the first shape;

determining, by the computer system, a second direction in which the second general path defines drawing of the second shape;

determining, by the computer system, that the first direction and the second direction are opposite; and based on the first direction being opposite the second direction, reversing, by the computer system, an order of drawing commands of a general path selected from the group consisting of: the first general path and the second general path.

7. The method for transitioning between data visualizations of claim 1, the method further comprising:

identifying, within the first general path, a first plurality of subpaths, wherein each subpath of the first plurality of subpaths define a separate shape;

defining each subpath of the first plurality of subpaths explicitly such that each subpath of the first plurality of subpaths begins with a command that defines a location;

identifying, within the second general path, a second plurality of subpaths, wherein each subpath of the second plurality of subpaths defines a separate shape; and defining each subpath of the second plurality of subpaths explicitly such that each subpath of the second plurality of subpaths begins with a command that defines a location.

8. The method for transitioning between data visualizations of claim 7, the method further comprising:

pairing the first plurality of subpaths with the second plurality of subpaths such that each subpath of the first plurality of subpaths is paired with a subpath of the second plurality of subpaths, wherein:

pairings between the first plurality of subpaths and the second plurality of subpaths are selected based on magnitudes of area defined by the shapes associated with the first plurality of subpaths and the second plurality of subpaths.

9. The method for transitioning between data visualizations of claim 1, the method further comprising:

defining, for a first subpath of the first general path, a first relative start point, wherein drawing of the first subpath of the first general path is configured to begin from the first relative start point; and defining, for a second subpath of the second general path, a second relative start point, wherein:

drawing of the second subpath of the second general path is configured to begin from the second relative start point, and the first relative start point and the second relative start point define corresponding locations of the first subpath and the second subpath.

10. A system for transitioning between data visualizations, the system comprising:

one or more processors; and a memory communicatively coupled with and readable by the one or more processors and having stored therein processor-readable instructions which, when executed by the one or more processors, cause the one or more processors to:

determine a first general path that defines a first shape and a second general path that defines a second shape, wherein:

the first shape and the second shape are different shapes, the first general path comprises a first plurality of drawing commands that define the first shape, and the second general path comprises a second plurality of drawing commands that define the second shape;

create a plurality of pairs of drawing commands such that each pair of the plurality of pairs of drawing commands includes a first drawing command from the first plurality of drawing commands of the first general path and a second drawing command from the second plurality of drawing commands of the second general path;

modify the plurality of pairs of drawing commands such that each pair of the plurality of pairs of drawing commands includes a single type of drawing command; and output for presentation a transition between the first shape and the second shape using the modified plurality of pairs of drawing commands.

11. The system for transitioning between data visualizations of claim 10, wherein the processor-readable instructions, when executed, further cause the one or more processors to:

add at least one null drawing command to the second general path such that the first general path and the second general path each have a same quantity of drawing commands.

12. The system for transitioning between data visualizations of claim 10, wherein the processor-readable instructions, when executed, further cause the one or more processors to:

receive a command to trigger a visual transition of the first shape into the second shape, wherein the transition between the first shape and the second shape using the modified plurality of pairs of drawing commands is performed based on receipt of the command.

13. The system for transitioning between data visualizations of claim 10, wherein the processor-readable instructions that, when executed, cause the one or more processors to modify the plurality of pairs of drawing commands such that each pair of the plurality of pairs of drawing commands includes the single type of drawing command comprise processor-readable instructions which, when executed, cause the one or more processors to, for a pair of drawing commands of the plurality of pairs of drawing commands:

convert the first drawing command of the first general path to a type of the second drawing command of the second general path, wherein the first drawing command is eligible to be expressed as the type of the second drawing command.

14. The system for transitioning between data visualizations of claim 10, wherein the processor-readable instructions, when executed, further cause the one or more processors to:

determine a first direction in which the first general path defines drawing of the first shape;

determine a second direction in which the second general path defines drawing of the second shape;

determine that the first direction and the second direction are opposite; and based on the first direction being opposite the second direction, reverse an order of drawing commands of a general path selected from the group consisting of: the first general path and the second general path.

15. The system for transitioning between data visualizations of claim 10, wherein the processor-readable instructions, when executed, further cause the one or more processors to:

identify, within the first general path, a first plurality of subpaths, wherein each subpath of the first plurality of subpaths define a separate shape;

define each subpath of the first plurality of subpaths explicitly such that each subpath of the first plurality of subpaths begins with a command that defines a location;

identify, within the second general path, a second plurality of subpaths, wherein each subpath of the second plurality of subpaths defines a separate shape; and define each subpath of the second plurality of subpaths explicitly such that each subpath of the second plurality of subpaths begins with a command that defines a location.

16. A non-transitory processor-readable medium for transitioning between data visualizations, comprising processor-readable instructions configured to cause one or more processors to:

determine a first general path that defines a first shape and a second general path that defines a second shape, wherein:

the first shape and the second shape are different shapes, the first general path comprises a first plurality of drawing commands that define the first shape, and the second general path comprises a second plurality of drawing commands that define the second shape;

create a plurality of pairs of drawing commands such that each pair of the plurality of pairs of drawing commands includes a first drawing command from the first plurality of drawing commands of the first general path and a second drawing command from the second plurality of drawing commands of the second general path;

modify the plurality of pairs of drawing commands such that each pair of the plurality of pairs of drawing commands includes a single type of drawing command; and output for presentation a transition between the first shape and the second shape using the modified plurality of pairs of drawing commands.

17. The non-transitory processor-readable medium for transitioning between data visualizations of claim 16, wherein the processor-readable instructions are further configured to cause the one or more processors to add at least one null drawing command to the second general path such that the first general path and the second general path each have a same quantity of drawing commands.

18. The non-transitory processor-readable medium for transitioning between data visualizations of claim 16, wherein the processor-readable instructions are further configured to cause the one or more processors to receive a command to trigger a visual transition of the first shape into the second shape, wherein the transition between the first shape and the second shape using the modified plurality of pairs of drawing commands is performed based on receipt of the command.

19. The non-transitory processor-readable medium for transitioning between data visualizations of claim 16, wherein the processor-readable instructions configured to cause the one or more processors to modify the plurality of pairs of drawing commands such that each pair of the plurality of pairs of drawing commands includes the single type of drawing command comprise processor-readable instructions configured to cause the one or more processors to, for a pair of drawing commands of the plurality of pairs of drawing commands:

convert the first drawing command of the first general path to a type of the second drawing command of the second general path, wherein the first drawing command is eligible to be expressed as the type of the second drawing command.

20. The non-transitory processor-readable medium for transitioning between data visualizations of claim 16, wherein the processor-readable instructions are further configured to cause the one or more processors to determine a first direction in which the first general path defines drawing of the first shape;

determine a second direction in which the second general path defines drawing of the second shape;

determine that the first direction and the second direction are opposite; and based on the first direction being opposite the second direction, reverse an order of drawing commands of a general path selected from the group consisting of: the first general path and the second general path.

* * * * *